United States Patent
Dobashi et al.

(10) Patent No.: US 11,550,289 B2
(45) Date of Patent: Jan. 10, 2023

(54) TOOL SYSTEM

(71) Applicant: PANASONIC INTELLECTUAL PROPERTY MANAGEMENT CO., LTD., Osaka (JP)

(72) Inventors: Kazuo Dobashi, Osaka (JP); Yukio Okada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 703 days.

(21) Appl. No.: 16/469,072

(22) PCT Filed: Nov. 30, 2017

(86) PCT No.: PCT/JP2017/043164
§ 371 (c)(1),
(2) Date: Jun. 12, 2019

(87) PCT Pub. No.: WO2018/123433
PCT Pub. Date: Jul. 5, 2018

(65) Prior Publication Data
US 2019/0294138 A1    Sep. 26, 2019

(30) Foreign Application Priority Data

Dec. 28, 2016  (JP) .............................. JP2016-256882
Sep. 25, 2017  (JP) .............................. JP2017-184110

(51) Int. Cl.
*G05B 19/00* (2006.01)
*G05B 19/18* (2006.01)
(Continued)

(52) U.S. Cl.
CPC ............ *G05B 19/182* (2013.01); *B25B 23/14* (2013.01); *B25F 5/02* (2013.01); *G05B 19/418* (2013.01);
(Continued)

(58) Field of Classification Search
CPC ........................... G06K 9/00577; B25B 23/14
See application file for complete search history.

(56) References Cited

U.S. PATENT DOCUMENTS 7,096,569 B1    8/2006 Barr et al.
10,592,772 B2 *  3/2020 Ishiyama ................ B25B 13/46
(Continued)

FOREIGN PATENT DOCUMENTS

EP    2 308 648 A2    4/2011
GB    2508090 A       5/2014
(Continued)

OTHER PUBLICATIONS

Search Report dated Jan. 2, 2020 issued for the corresponding European Patent Application No. 17888011.8.
(Continued)

*Primary Examiner* — Eyamindae C Jallow
(74) *Attorney, Agent, or Firm* — McDermott Will & Emery LLP

(57) ABSTRACT

An object of the present invention is to provide a tool system allowing a tool to be controlled on a work object basis before the work is started. A tool system includes a portable tool and an identification unit. The tool includes a driving unit to operate with power supplied from a battery pack. The identification unit identifies, by a contactless method, a current work object, to which the tool is set in place, out of a plurality of work objects.

17 Claims, 11 Drawing Sheets

(51) Int. Cl.
*B25F 5/02* (2006.01)
*G05B 19/418* (2006.01)
*B25B 23/14* (2006.01)
*B25B 21/02* (2006.01)
*B25B 23/147* (2006.01)

(52) U.S. Cl.
CPC ........... *B25B 21/02* (2013.01); *B25B 23/1475* (2013.01); *G05B 2219/37095* (2013.01); *Y02P 90/02* (2015.11); *Y02P 90/30* (2015.11)

(56) References Cited

U.S. PATENT DOCUMENTS

| | | | |
|---|---|---|---|
| 2008/0115589 A1 | 5/2008 | DeRose et al. | |
| 2012/0222876 A1 | 9/2012 | Schmidt et al. | |
| 2013/0174698 A1 | 7/2013 | Yamamoto et al. | |
| 2014/0153831 A1* | 6/2014 | Ishiyama | G06Q 30/0278 382/190 |
| 2016/0042245 A1* | 2/2016 | Ishiyama | G06K 9/6267 382/190 |
| 2016/0048730 A1* | 2/2016 | Ishiyama | G06K 9/42 382/108 |
| 2016/0055398 A1* | 2/2016 | Ishiyama | G06K 9/036 382/190 |
| 2016/0109281 A1* | 4/2016 | Herring | G06Q 30/0633 177/1 |
| 2016/0191434 A1* | 6/2016 | Rice | G06K 9/00228 709/204 |
| 2017/0344823 A1* | 11/2017 | Withrow | G06F 21/30 |
| 2018/0089535 A1 | 3/2018 | Ishiyama et al. | |

FOREIGN PATENT DOCUMENTS

| | | |
|---|---|---|
| JP | H10-037459 A | 2/1998 |
| JP | 2012-020353 A | 2/2012 |
| JP | 2013-132736 A | 7/2013 |
| JP | 2013-151043 A | 8/2013 |
| JP | 2014-096068 A | 5/2014 |
| JP | 2015-208822 A | 11/2015 |
| JP | 2016-091316 A | 5/2016 |
| NO | 2014/002322 A1 | 1/2014 |
| WO | 2012/017956 A1 | 2/2012 |
| WO | 2016/158690 A1 | 10/2016 |
| WO | WO-2017001175 A1 * | 1/2017 ............ B25B 23/14 |

OTHER PUBLICATIONS

International Search Report and Written Opinion issued in International Patent Application No. PCT/JP2017/043164, dated Jan. 30, 2018; with partial English translation.

* cited by examiner

TOOL SYSTEM

CROSS-REFERENCE OF RELATED APPLICATIONS

This application is the U.S. National Phase under 35 U.S.C. § 371 of International Patent Application No. PCT/JP2017/043164, filed on Nov. 30, 2017, which in turn claims the benefit of Japanese Application No. 2016-256882, filed on Dec. 28, 2016 and Japanese Application No. 2017-184110, filed on Sep. 25, 2017, the entire disclosures of which Applications are incorporated by reference herein.

TECHNICAL FIELD

The present disclosure generally relates to a tool system, and more particularly relates to a tool system including a portable tool.

BACKGROUND ART

A work management system has been known which is designed to manage various kinds of work each requiring some type of tool (see, for example, Patent Literature 1). The work management system disclosed in Patent Literature 1 includes a tool and a work manager. The tool is used to perform some kind of work on a work object. The work manager includes a work information acquisition unit, a location information acquisition unit, a work object information acquisition unit, and an information management unit. The work information acquisition unit acquires, from the tool used to perform the work on the work object, work information about the type of the work that has been done on the work object. The location information acquisition unit acquires information about a location where the work has been done on the work object using the tool. The work object information acquisition unit acquires work object information to identify the work object based on the information that has been read from the work object. The information management unit makes a storage unit store the work information, the location information, and the work object information in association with each other.

The location information acquisition unit acquires the location information of the workplace based on positioning data provided by a GPS receiver for determining the current location based on radio waves received from a global positioning system (GPS) satellite, for example.

Patent Literature 1 also describes a positioning system for determining the current location by receiving beacon radio waves radiated from a plurality of sites on the ground.

According to Patent Literature 1, the work information about the type of the work that has been done on the work object is acquired by using the work manager separately from the tool. That is to say, according to Patent Literature 1, it is not until the work has been done that the work information about the work is acquired. This makes it difficult to change, before the work is started, the type of control over the tool on a work object basis.

CITATION LIST

Patent Literature

Patent Literature 1: JP 2016-91316 A

SUMMARY OF INVENTION

It is therefore an object of the present disclosure to provide a tool system allowing a tool to be controlled on a work object basis before the work is started.

A tool system according to the present disclosure includes a portable tool and an identification unit. The tool includes a driving unit to operate with power supplied from a power source. The identification unit identifies, by a contactless method, a current work object, on which the tool is set in place, out of a plurality of work objects.

DESCRIPTION OF EMBODIMENTS

An embodiment of the present disclosure will be described with reference to the accompanying drawings. Note that the embodiment to be described below is only one of various embodiments of the present disclosure, and may be readily modified, changed, replaced, or combined with any other embodiments, depending on a design choice or any other factor, without departing from a true spirit and scope of the present disclosure.

(1) First Embodiment
(1.1) Configuration

Figure 1:
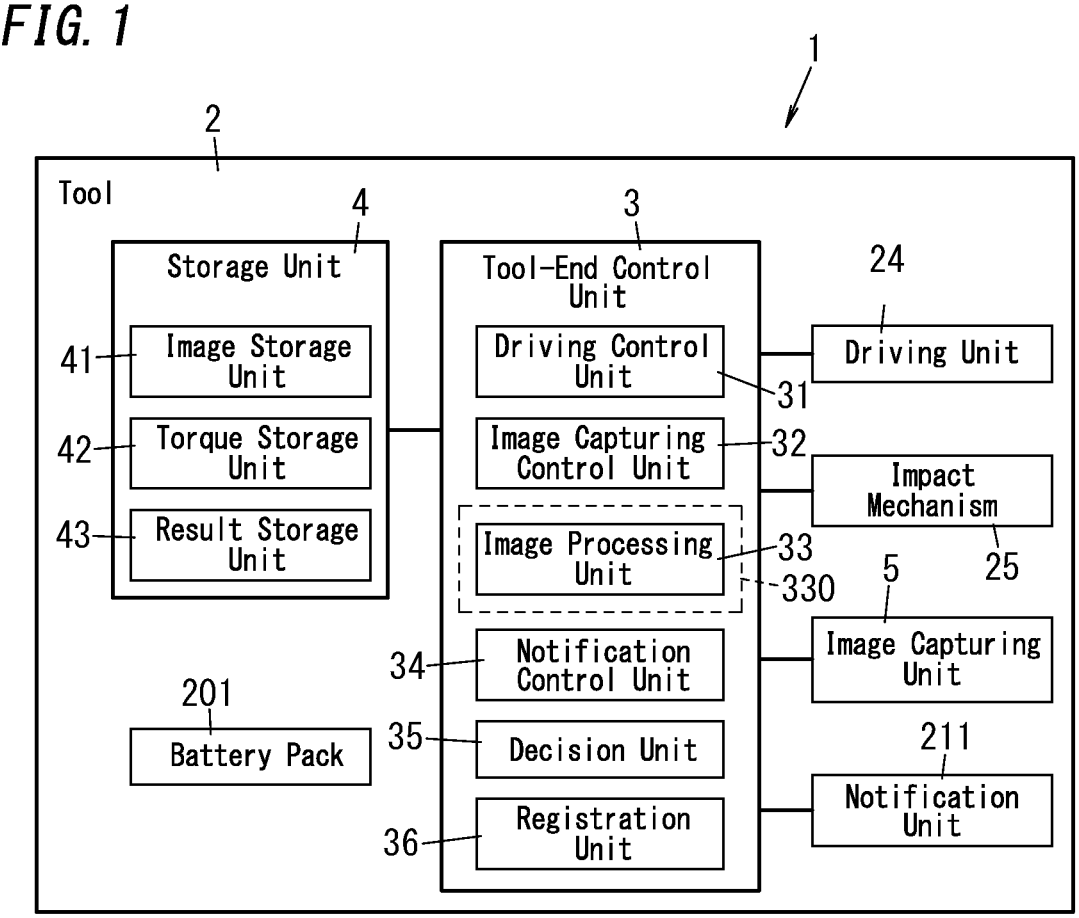
FIG. 1 is a block diagram of a tool system according to a first embodiment of the present disclosure.

FIG. 1 is a block diagram of a tool system 1 according to an exemplary embodiment. The tool system 1 according to this embodiment may be used, for example, in an assembly line for performing assembling work on products at a factory. Specifically, this embodiment is supposed to be applied to an assembly line in which a single product has a plurality of portions to be fastened, thus requiring the worker to attach a fastening member (such as a nut or a bolt) onto each of those portions to be fastened by using a tool 2 at the same workplace. As used herein, the "portion to be fastened" refers to an area surrounding, and covering, a screw hole to which the fastening member is attached. This embodiment will be described as being applied to a situation where the work object, to which the tool 2 is applied, is the portion to be fastened. As used herein, the "work object" refers to an object (such as a workpiece or a working area) on which work is supposed to be performed by using the tool 2. The tool system 1 according to this embodiment is configured to identify a current work object, on which the tool 2 is set in place, out of a plurality of work objects. As used herein, the phrase "the tool 2 is set in place" refers to a situation where the tool 2 has been placed so as to be ready to perform work on the work object. As used herein, the phrase "placed so as to be ready to perform work" refers to not only a situation where the tool 2 is already in contact with the work object but also a situation where the tool 2 is being brought into contact with the work object. That is to say, when the tool 2 is set in place on the work object, the tool 2 may be already in contact with the work object or may be still out of contact with the work object. Note that the tool system 1 does not have to be applied to the assembly line but may find any other application as well.

A detailed configuration for the tool system 1 according to this embodiment will be described with reference to FIG. 1.

The tool 2 may be an electric impact wrench (see FIGS. 2A and 2B), for example, and may be used to perform fastening work of attaching a fastening member onto a work object. The tool 2 includes a driving unit 24, a tool-end control unit 3, a storage unit 4, an image capturing unit 5, and a battery pack 201.

Figure 2A:
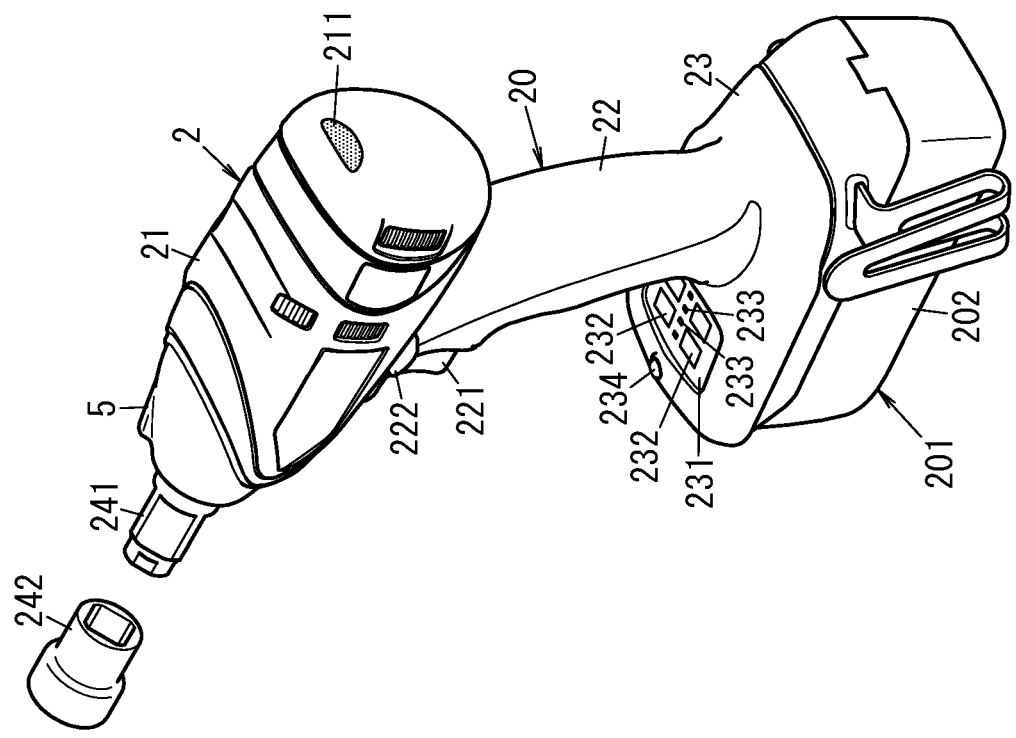
FIG. 2A is a perspective view illustrating the appearance, as viewed from a first direction, of a tool included in the tool system.
Figure 2B:
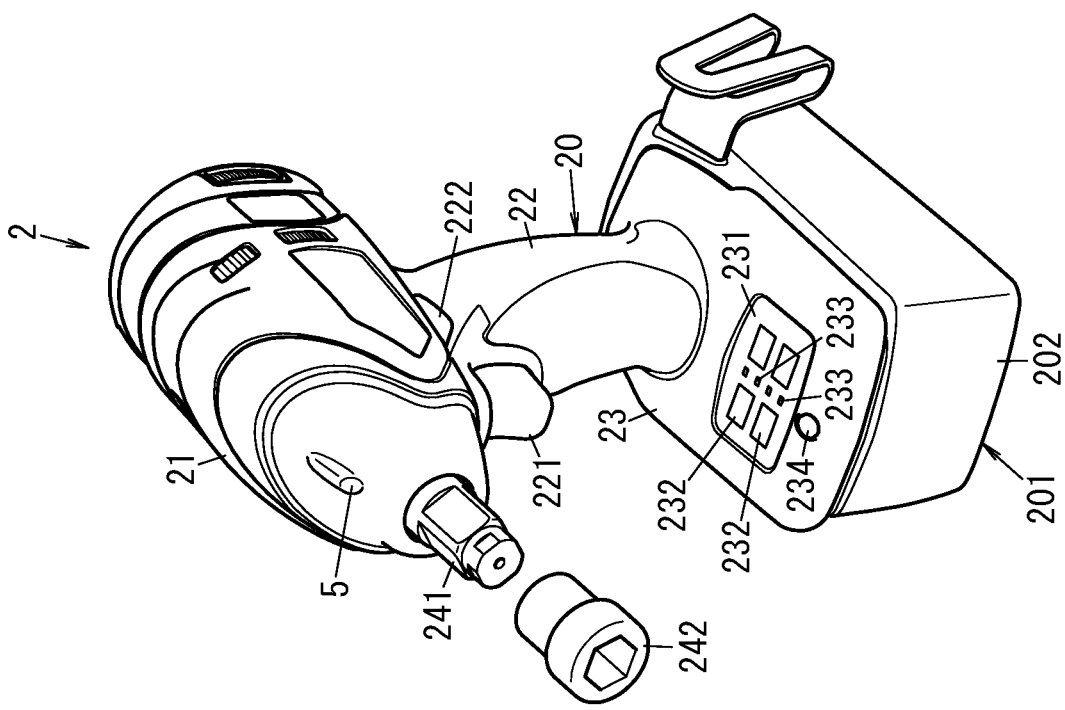
FIG. 2B is a perspective view illustrating the appearance, as viewed from a second direction, of the tool included in the tool system.

As shown in FIGS. 2A and 2B, a body 20 of the tool 2 includes a cylindrical barrel 21, a grip 22 protruding radially from a circumferential surface of the barrel 21, and an attachment member 23 to which the battery pack 201 is attached detachably.

The driving unit 24 is housed in the barrel 21. The driving unit 24 includes a motor, and is configured to perform rotational operation with power supplied from the battery pack 201 as a power source. An output shaft 241 protrudes from one axial end of the barrel 21 (see FIGS. 2A and 2B). The output shaft 241 is configured to turn as the driving unit 24 performs the rotational operation. A cylindrical socket 242 for fastening or loosening a fastening member (such as a nut or a bolt) is attached detachably onto the output shaft 241. The size of the socket 242 attached to the output shaft 241 may be selected appropriately by the worker according to the size of the fastening member. Turning the output shaft 241 by making the driving unit 24 perform the rotational operation allows the tool 2 to perform the work of fastening or loosening the fastening member.

Optionally, a socket anvil may also be attached detachably, instead of the socket 242, onto the output shaft 241, thus allowing a bit (such as a screwdriver bit or a drill bit) to be attached via the socket anvil.

The tool 2 according to this embodiment includes the impact mechanism 25. The impact mechanism 25 is configured to, when (the work value of) fastening torque exceeds a predetermined level, apply striking force in the rotational direction of the output shaft 241. This allows greater fastening torque to be applied to the fastening member.

The grip 22 is a portion to be gripped by the worker while performing the work, and is provided with a trigger switch 221 and a rotational direction inverting switch 222. The trigger switch 221 is a switch for controlling the ON/OFF states of the rotational operation by the driving unit 24 and allows the worker to adjust the number of revolutions of the driving unit 24 by changing the depth of the switch 221 pressed. The rotational direction inverting switch 222 is a switch for switching the rotational direction of the output shaft 241 from the clockwise direction into the counterclockwise direction, and vice versa. The attachment member 23 is provided at the other end, opposite from the barrel 21, of the grip 22.

The attachment member 23 is formed in the shape of a compressed rectangular parallelepiped, and the battery pack 201 is attached detachably to one side thereof opposite from the grip 22. The battery pack 201 includes a case 202 (see FIGS. 2A and 2B) made of a resin and formed in a rectangular parallelepiped shape, and houses a rechargeable battery (such as a lithium-ion battery) inside the case 202. The battery pack 201 supplies power to the driving unit 24, the tool-end control unit 3, the image capturing unit 5, and other constituent members.

The attachment member 23 is also provided with a control panel 231. The control panel 231 may include a plurality of press button switches 232 and a plurality of LEDs (light-emitting diodes) 233, for example, which allow the worker to enter various types of settings for, and confirm the state of, the tool 2. For example, by operating the control panel 231 (press button switches 232), the worker is allowed to change the operation mode of the tool 2 or the check the battery level of the battery pack 201. The attachment member 23 further includes a light-emitting unit 234, which may be implemented as an LED, for example. The light-emitting unit 234 is arranged to emit light toward the work object during the work. The light-emitting unit 234 may be turned ON and OFF by operating the control panel 231. Alternatively, the light-emitting unit 234 may also be configured to be lit when the trigger switch 221 turns ON.

The tool-end control unit 3 is housed in the attachment member 23. The tool-end control unit 3 includes a microcomputer (microcontroller) including a processor and a memory. The tool-end control unit 3 performs the functions of a driving control unit 31, an image capturing control unit 32, an image processing unit 33, a notification control unit 34, a decision unit 35, and a registration unit 36 by making the processor execute a program stored in the memory. The program to be executed by the processor may be stored in advance in the memory of the microcomputer or may also be distributed after having been stored on a non-transitory storage medium such as a memory card or downloaded via a telecommunications line such as the Internet. Note that if no operating command is entered into the trigger switch 221 or the control panel 231 for a certain period of time, the tool-end control unit 3 enters a sleep mode. The tool-end control unit 3 is activated when any operating command is entered, during the sleep mode, into either the trigger switch 221 or the control panel 231.

The driving control unit 31 is configured to control the driving unit 24. Specifically, the driving control unit 31 makes the driving unit 24 turn at the rotational velocity determined by the press depth of the trigger switch 221 and in the rotational direction set by the rotational direction inverting switch 222.

The driving control unit 31 is also configured to control the driving unit 24 such that the fastening torque becomes equal to a torque setting (working setting). The driving control unit 31 has a torque estimating function of estimating the magnitude of fastening torque. The driving control unit 31 estimates, until the estimated value of the fastening torque reaches a seating determination level, the magnitude of the fastening torque based on the rotational velocity, a variation in the number of revolutions, or any other parameter of the driving unit 24 (motor) between the strokes of the impact mechanism 25. When the estimated value of the fastening torque reaches the seating determination level, the driving control unit 31 estimates the magnitude of the fastening torque based on the number of strokes by the impact mechanism 25. When finding the number of stokes by the impact mechanism 25 has reached a threshold number of times based on the torque setting, the driving control unit 31 determines that the fastening torque should have reached a torque setting, and stops the motor. This makes the fastening torque when the fastening member is attached a torque setting. The torque setting will be described later.

Optionally, the tool 2 may include a torque sensor for measuring the fastening torque. In that case, the driving control unit 31 controls the driving unit 24 such that the fastening torque measured by the torque sensor becomes the torque setting.

The image capturing control unit 32 is configured to control the image capturing unit 5. The image capturing unit 5 may be implemented as a camera including an image capture device and a lens, for example, and may be housed in the barrel 21 of the body 20. The image capturing unit 5 is arranged to capture an image of the work object during the work. In this embodiment, the image capturing unit 5 is arranged along the output shaft 241 and within a predetermined range from the output shaft 241 so as to capture an image beyond the tip of the output shaft 241. In addition, the image capturing unit 5 is also arranged such that the socket attached to the output shaft 241 falls within the image capturing range. The image capturing unit 5 is configured to capture images continuously while the tool-end control unit 3 is activated. Thus, the image capturing unit 5 generates a time series of captured images in the form of moving pictures and outputs those images to the image processing unit 33.

The image processing unit 33 is configured to identify, as a current work object, one, shot on the spot in the captured image (hereinafter referred to as an "actually shot work object"), out of a plurality of work objects by performing image processing on the image captured by the image capturing unit 5. That is to say, the image processing unit 33 performs the function of an identification unit 330 for identifying the current work object on which the tool 2 is set in place. The identification unit 330 (image processing unit 33) uses the image capturing unit 5 provided for the tool 2 as a sensor and identifies, based on the output (captured image) of the sensor (image capturing unit 5), the current work object on which the tool 2 is set in place. Specifically, the image processing unit 33 performs, on the image captured by the image capturing unit 5, pattern matching processing using a plurality of reference images associated the plurality of work objects as template data, thereby identifying the actually shot work object. The image processing unit 33 identifies the actually shot work object by performing image processing (pattern matching processing), on a frame basis, on the data output, in a moving picture format, from the image capturing unit 5, for example. Thus, if the work object falls within the image capturing range of the image capturing unit 5, the image processing unit 33 is able to determine which of the plurality of work objects the image capturing unit 5 is capturing an image of. The plurality of reference images are stored in the storage unit 4 (image storage unit 41).

The storage unit 4 may be implemented as a semiconductor memory such a flash memory, and performs the function of the image storage unit 41, a torque storage unit 42 (target value storage unit), and a result storage unit 43. In this embodiment, the image storage unit 41, the torque storage unit 42, and the result storage unit 43 are implemented as a single memory. However, this is only an example and should not be construed as limiting. Alternatively, these units 41, 42, and 43 may also be implemented as three different memories. Still alternatively, the storage unit 4 may also be implemented as a memory card attachable to, and removable from, the tool 2.

The image storage unit 41 stores a plurality of reference image in association with the plurality of work objects. Each reference image is a still image obtained by capturing an associated work object. Optionally, a single work object may be associated with a plurality of reference images obtained by shooting the work object from various angles and in multiple different sizes.

The notification control unit 34 is configured to control a notification unit 211 provided for the tool 2. The notification unit 211 may be implemented as an LED, for example. The notification unit 211 may be provided for the other end, opposite from the output shaft 241, of the barrel 21 of the body 20 so as to be easily viewed by the worker during the work (see FIG. 2B). The notification control unit 34 lights the notification unit 211 when the image processing unit 33 identifies the actually shot work object. By seeing the notification unit 211 lit, the worker recognizes that the image processing unit 33 has identified the actually shot work object.

The torque storage unit 42 stores a plurality of target torque values (target values) in association with the plurality of work objects one to one. As used herein, the "target torque value" refers to the target value of a fastening torque when a fastening member is attached to an associated work object.

The driving control unit 31 acquires, when the image processing unit 33 identifies the actually shot work object, a target torque value associated with the actually shot work object from the torque storage unit 42. Then, the driving control unit 31 may set a value based on the target torque value thus acquired as a torque setting. In this embodiment, the driving control unit 31 sets the target torque value thus acquired as the torque setting.

In addition, once the image processing unit 33 has identified the actually shot work object, the driving control unit 31 holds the target torque value associated with the actually shot work object as the torque setting until another work object is shot in the captured image. This allows, even if the image processing unit 33 has become unable to identify the actually shot work object just before starting the fastening work, for example, the fastening member to be fastened at the target torque value associated with the actually shot work object.

In addition, once the trigger switch 221 has been turned ON, the driving control unit 31 holds the torque setting until the trigger switch 221 is turned OFF, to prevent the torque setting from varying during the fastening work.

Optionally, the driving control unit 31 may also be configured to activate the driving unit 24 when the trigger switch 221 is turned ON, only in a situation where the image processing unit 33 has identified the actually shot work object successfully. This reduces the chances of the fastening work being performed at a torque value different from the target torque value associated with the actually shot work object, in a situation where the image processing unit 33 has failed to identify the actually shot work object.

The decision unit 35 is configured to determine whether or not the fastening torque is a normal one when the fastening member is attached to the portion to be fastened.

If the driving control unit 31 has deactivated the driving unit 24 on detecting that the number of strokes by the impact mechanism 25 has reached the threshold number of times, then the decision unit 35 determines that the fastening torque should be normal. On the other hand, if the driving control unit 31 has deactivated the driving unit 24 by turning the trigger switch 221 OFF before the number of strokes by the impact mechanism 25 reaches the threshold number of times, then the decision unit 35 determines that the fastening torque should be insufficient (abnormal). The decision unit 35 also performs result storage processing of storing the decision results in the result storage unit 43 in association with the portion to be fastened.

Optionally, if the tool 2 includes a torque sensor for measuring the fastening torque, then the decision unit 35 may be configured to determine, by comparing the result of measurement by the torque sensor with the target torque value, whether or not the fastening torque is normal. On finding the result of measurement by the torque sensor falling within a predetermined range based on the target torque value, the decision unit 35 determines that the fastening torque should be a normal one. On the other hand, on finding the result of measurement by the torque sensor falling outside of the predetermined range based on the target torque value, the decision unit 35 determines that the fastening torque should be an insufficient (abnormal) one.

The result storage unit 43 stores the decision results obtained by the decision unit 35 with respect to a plurality of portions to be fastened in association with the plurality of work objects. It is recommended that the result storage unit 43 store the decision results obtained by the decision unit 35 with time stamps, indicating the working times, added thereto. This allows the work object decision results to be distinguished from one product to another on the assembly line.

According to the present disclosure, the tool 2 according to this embodiment has, as its operation modes, a working mode and a registration mode. As used herein, the "working mode" refers to an operation mode in which the worker performs some type of work using the tool 2. The registration mode refers herein to an operation mode in which a plurality of reference images are stored in the image storage unit 41 and a plurality of target torque values are stored in the torque storage unit 42. The operation mode may be switched by operating the control panel 231. Alternatively, the operation mode may also be switched by operating another member, such as a dip switch, instead of the control panel 231.

The registration unit 36 is configured to, when the operation mode of the tool 2 is the registration mode, perform image registration processing of making the image storage unit 41 store the plurality of reference images and torque registration processing of making the torque storage unit 42 store the plurality of target torque values.

The registration unit 36 makes the torque storage unit 42 store, as a target torque value during the torque registration processing, the torque setting when the fastening member is attached to the work object. Specifically, when the operation mode of the tool 2 is the registration mode, the worker may enter any arbitrary torque value by operating the control panel 231, and the driving control unit 31 sets the torque value entered as the torque setting. When the fastening member is attached to the work object, the registration unit 36 makes the torque storage unit 42 store the torque setting at this time.

In addition, the registration unit 36 also makes, during the image registration processing, the image storage unit 41 store, as a reference image, the still image generated by having the image capturing unit 5 capture an image of the work object. Specifically, when the operation mode of the tool 2 is the registration mode, the trigger switch 221 also functions as a shutter release button. That is to say, when the trigger switch 221 turns ON, the image capturing unit 5 generates a still image. The registration unit 36 makes the image storage unit 41 store the still image as a reference image.

That is to say, according to this embodiment, when the operation mode of the tool 2 is the registration mode, the trigger switch 221 performs both the function as a switch for activating the driving unit 24 and the function as a shutter release button for generating the reference image. Thus, performing the fastening work when the operation mode of the tool 2 is the registration mode allows the registration unit 36 to perform the torque registration processing and the image registration processing in parallel with each other. Specifically, the registration unit 36 makes the torque storage unit 42 store, as the target torque value, a torque setting during the fastening work and also makes the image storage unit 41 store, as the reference image, a still image of the work object during the fastening work.

Note that the image registration processing does not have to be the processing of making the image storage unit 41 store, as a reference image, the still image generated by the image capturing unit 5. Alternatively, the image registration processing may also be the processing of registering, as a reference image, a still image downloaded from a server with the image storage unit 41, or the processing of registering, as a reference image, a still image acquired from an external memory such as a memory card with the image storage unit 41.

(1.2) Exemplary Operation

Figure 3:
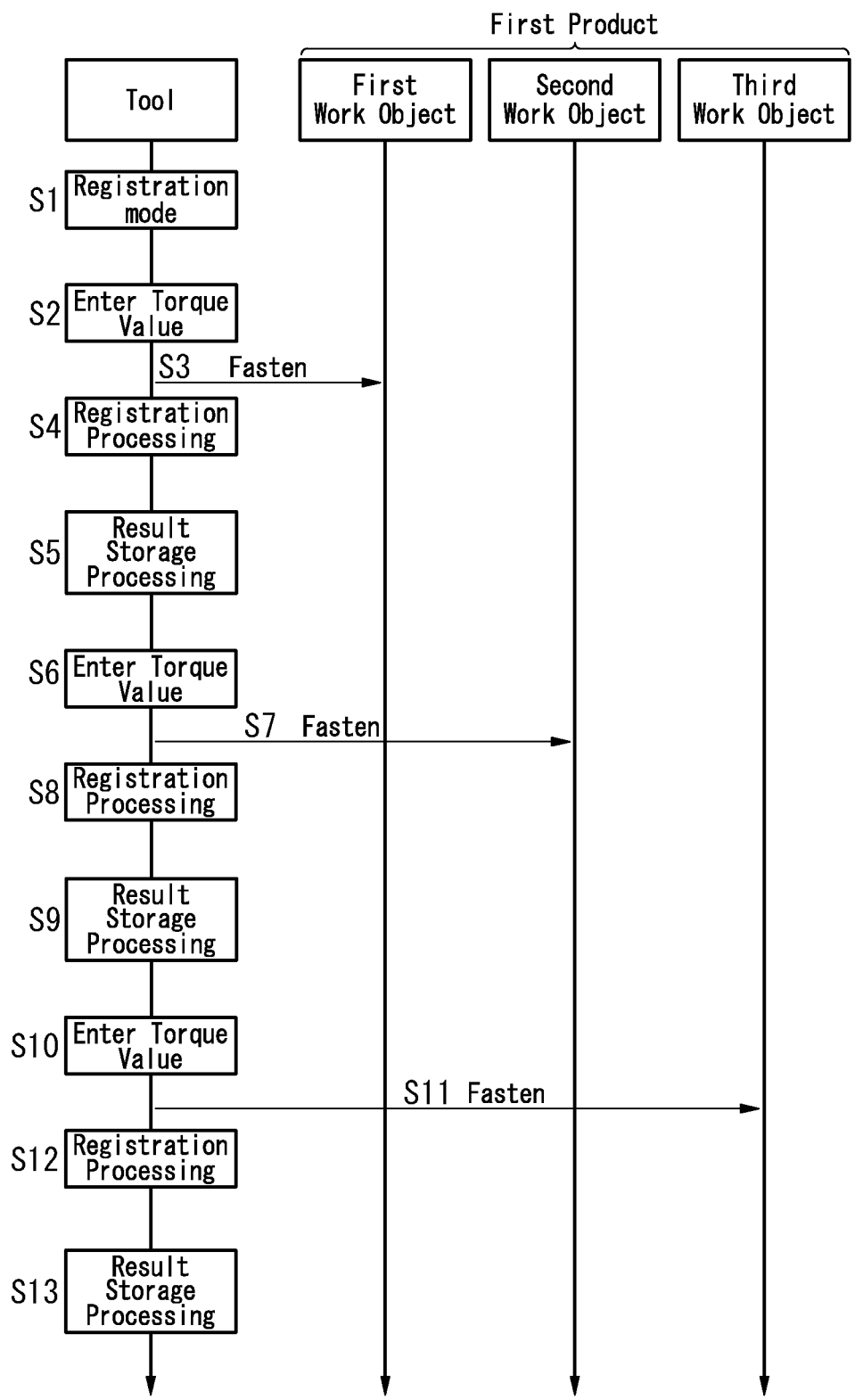
FIG. 3 shows the sequence of operations to be performed when the operation mode of the tool in the tool system is a registration mode.
Figure 4:
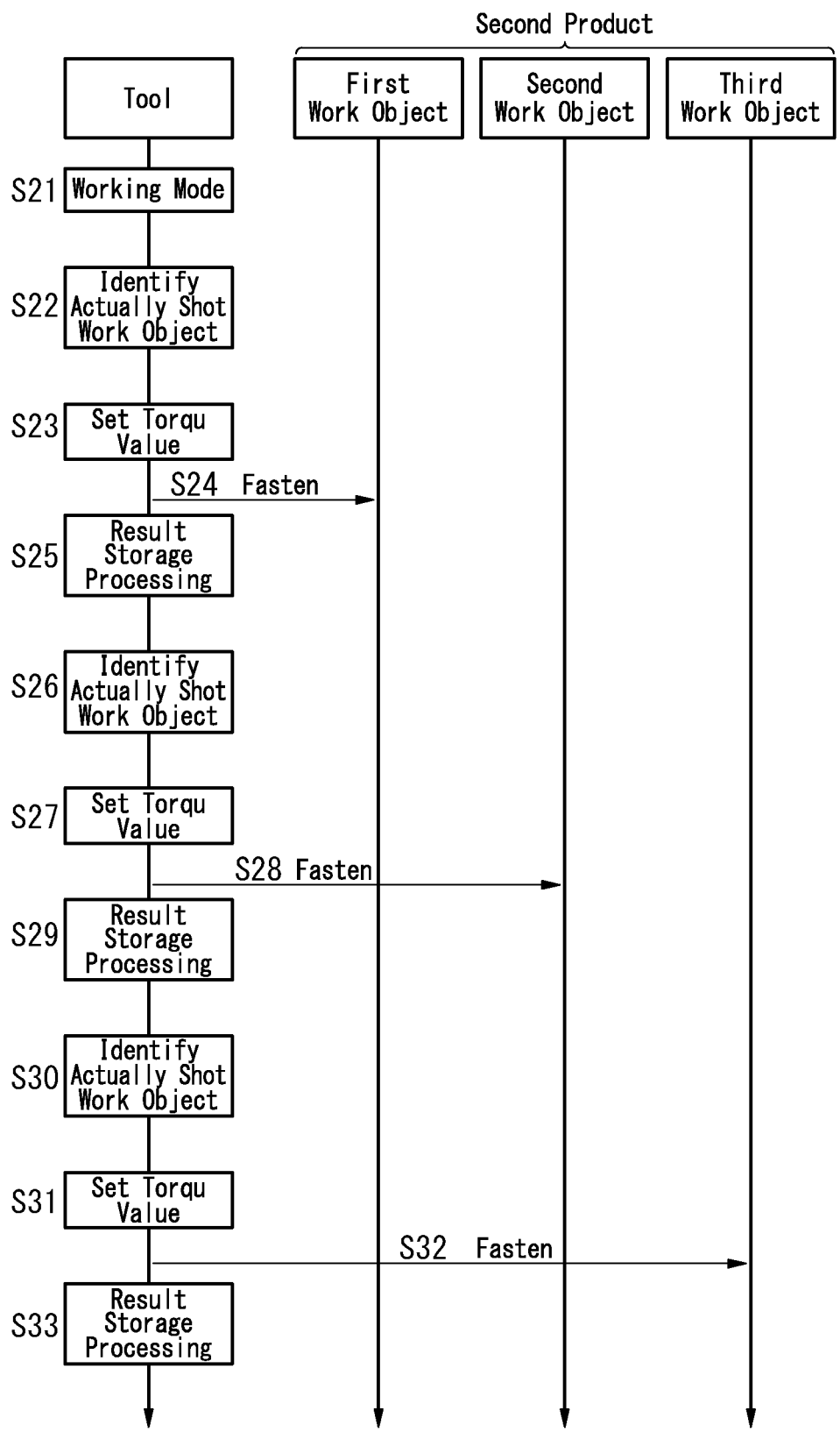
FIG. 4 shows the sequence of operations to be performed when the operation mode of the tool in the tool system is a working mode.

Next, an exemplary operation of the tool system 1 according to this embodiment will be described with reference to FIGS. 3 and 4. In the following example, it will be described how the tool system 1 operates when the worker performs the work of assembling two products of the same type (hereinafter referred to as a "first product" and a "second product," respectively) on an assembly line. Each product is supposed to have three work objects (hereinafter referred to as "first, second, and third work objects," respectively) and the worker is supposed to perform the work of attaching a fastening member onto each of these work objects. In addition, both the image registration processing and the torque registration processing are yet to be performed by the registration unit 36 on the tool 2, and none of the first to third reference images and first to third target torque values corresponding to the first, second, and third work objects, respectively, are stored in the image storage unit 41 or the torque storage unit 42 yet.

First of all, an exemplary operation of the tool system 1 when the first product is assembled will be described with reference to FIG. 3. The worker sets the operation mode of the tool 2 at registration mode (in Step S1). Next, the worker operates the control panel 231 to enter the torque value of the fastening torque when the fastening member is attached to the first work object (in Step S2). The driving control unit 31 sets the entered torque value as a torque setting. Then, the worker performs the fastening work of attaching the fastening member onto the first work object by pressing the trigger switch 221 (in Step S3). At this time, the first work object is shot, thus generating a still image of the first work object.

When the fastening work is done, the registration unit 36 performs registration processing (including image registration processing and torque registration processing) (in Step S4). Specifically, the registration unit 36 performs the image registration processing of making the image storage unit 41 store, as a first reference image associated with the first work object, a still image of the first work object generated during the fastening work in Step S3. In addition, the registration unit 36 also performs the torque registration processing of making the torque storage unit 42 store, as a first target torque value associated with the first work object, a torque setting when the fastening member is attached to the first work object during the fastening work in Step S3. That is to say, the first target torque value is associated with the first reference image.

The decision unit 35 performs result storage processing of making the result storage unit 43 store, in association with the first work object, a first decision result indicating whether or not the fastening torque when the fastening member is attached to the first work object is a normal one (in Step S5).

In addition, the worker sequentially performs the fastening work on the second and third work objects in this order in the same working procedure as the first work object. Specifically, the worker operates the control panel 231 to enter the torque value of the fastening torque when the fastening member is attached to the second work object (in Step S6) and then performs the fastening work of attaching the fastening member to the second work object (in Step S7). At this time, a still image of the second work object is generated and the registration unit 36 performs the registration processing (including the image registration processing and the torque registration processing) (in Step S8). The decision unit 35 performs result storage processing of making the result storage unit 43 store a second decision result indicating whether or not the fastening torque during the fastening work in Step S7 is a normal one (in Step S9).

When the fastening work is done on the second work object, the worker performs the fastening work on the third work object. Specifically, the worker operates the control panel 231 to enter the torque value of the fastening torque when the fastening member is attached to the third work object (in Step S10) and then performs the fastening work of attaching the fastening member to the third work object (in Step S11). At this time, a still image of the third work object is generated and the registration unit 36 performs the registration processing (including the image registration processing and the torque registration processing) (in Step S12). The decision unit 35 performs result storage processing of making the result storage unit 43 store a third decision result indicating whether or not the fastening torque during the fastening work in Step S11 is a normal one (in Step S13).

When the work of assembling the first product (i.e., the fastening work on the first, second, and third work objects) is completed, the worker performs the work of assembling the second product. Next, an exemplary operation of the tool system 1 when the worker performs the work of assembling the second product will be described with reference to FIG. 4.

The worker operates the control panel 231 to switch the operation mode of the tool 2 from the registration mode into the working mode (in Step S21). Then, the worker performs the work of assembling the second product with the operation mode of the tool 2 set at the working mode.

The worker directs the image capturing unit 5 toward the first work object of the second product. The image processing unit 33 performs image processing to identify the first work object as the actually shot work object (in Step S22). This allows the driving control unit 31 to set a first target torque value associated with the first work object as the torque setting (in Step S23).

On confirming that the first work object has been identified by the notification unit 211, the worker performs the fastening work of attaching the fastening member onto the first work object (in Step S24).

The decision unit 35 performs result storage processing of making the result storage unit 43 store, in association with the first work object, a first decision result indicating whether or not the fastening torque when the fastening member is attached to the first work object is a normal one (in Step S25).

In addition, the worker sequentially performs the fastening work on the second and third work objects in this order in the same working procedure as the first work object. Specifically, the worker directs the image capturing unit 5 toward the second work object. This allows the image processing unit 33 to identify the second work object as the actually shot work object (in Step S26). The driving control unit 31 sets a second target torque value associated with the second work object as the torque setting (in Step S27). The worker performs the fastening work of attaching the fastening member onto the second work object (in Step S28). The decision unit 35 performs result storage processing of making the result storage unit 43 store a second decision result indicating whether or not the fastening torque during the fastening work in Step S28 is a normal one (in Step S29).

When the fastening work on the second work object is completed, the worker performs the fastening work on the third work object. Specifically, the worker directs the image capturing unit 5 toward the third work object. This allows the image processing unit 33 to identify the third work object as the actually shot work object (in Step S30). The driving control unit 31 sets a third target torque value associated with the third work object as the torque setting (in Step S31). The worker performs the fastening work of attaching the fastening member onto the third work object (in Step S32). The decision unit 35 performs result storage processing of making the result storage unit 43 store a third decision result indicating whether or not the fastening torque during the fastening work in Step S32 is a normal one (in Step S33).

From the third product and on, the worker will perform the assembling work in the same way as in the second product with the operation mode of the tool 2 also set at the working mode. Also, if the reference image and the target torque value are respectively stored in the image storage unit 41 and the torque storage unit 42 during the work, no registration mode is needed.

Note that the work on the first, second, and third work objects does not always have to be performed in the order described above but may also be performed in any other order. The tool system 1 identifies the work objects by their captured images. That is why even if the work on those work objects is performed in a different order, the fastening work is still able to be performed at their associated target torque values.

(2) Variations

Next, variations of the tool system 1 will be described. In the following description, any constituent element of the variations, having the same function as a counterpart of the embodiment described above, will be designated by the same reference numeral as that counterpart's, and a detailed description thereof will be omitted herein.

(2.1) First Variation

Figure 5:
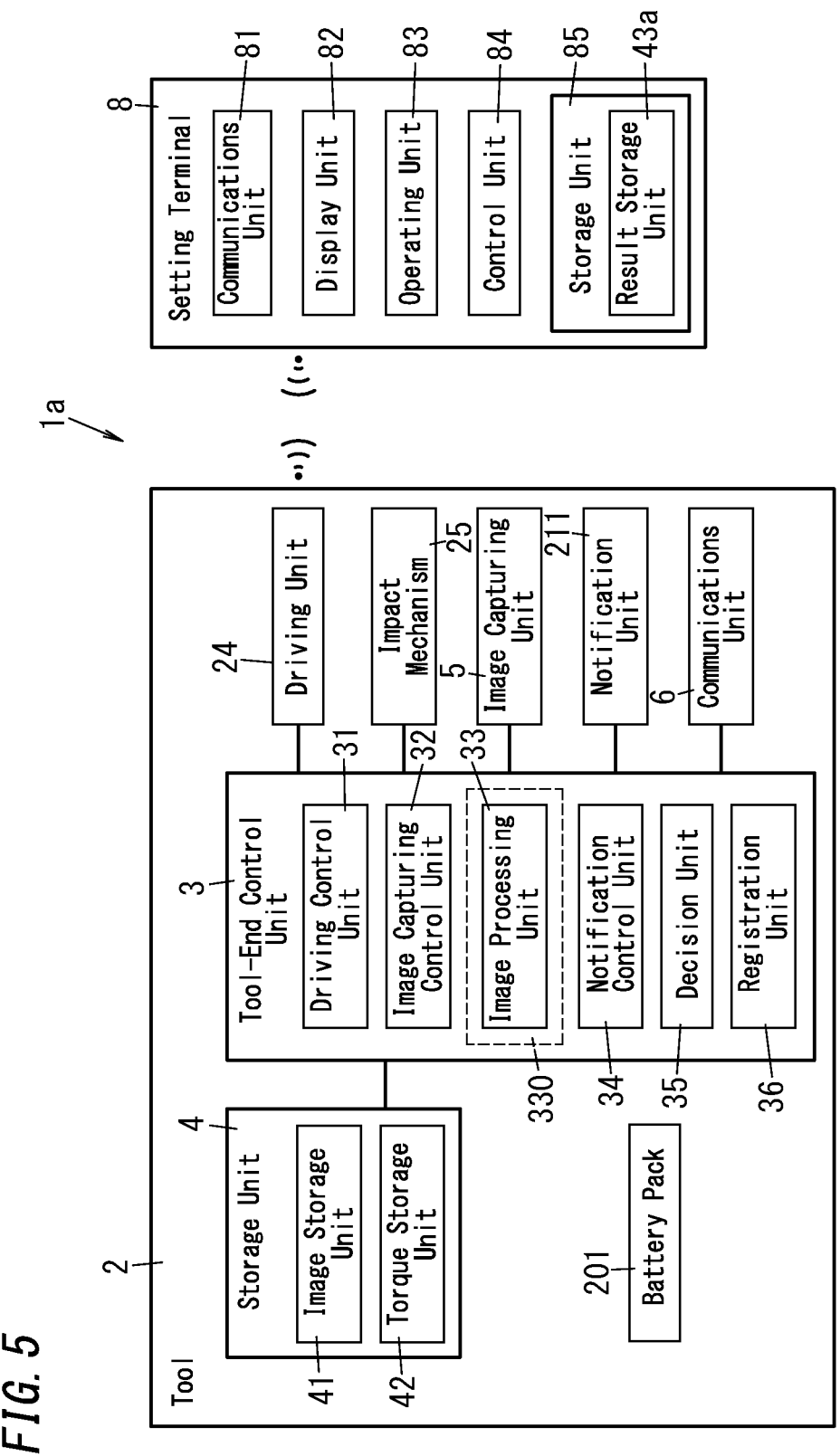
FIG. 5 is a block diagram of a tool system according to a first variation of the first embodiment of the present disclosure.

FIG. 5 is a block diagram of a tool system 1a according to a first variation. The tool system 1a according to this variation includes a setting terminal 8, which is a major difference from the tool system 1 according to the exemplary embodiment described above. This variation allows the worker to confirm the image captured by the image capturing unit 5 or the result of decision made by the decision unit 35 and enter the target torque value by using the setting terminal 8.

The tool 2 according to this variation further includes a communications unit 6. The communications unit 6 is a communications module that enables wireless communication compliant with the Wi-F® or any other standard to be established and is housed in the body 20. Alternatively, the communications unit 6 may also be a communications module that enables wired communication to be established.

The setting terminal 8 may be a mobile telecommunications terminal such as a smartphone or a tablet computer, for example, and includes a communications unit 81, a display unit 82, an operating unit 83, a control unit 84, and a storage unit 85.

The communications unit 81 may be a communications module that enables wireless communication compliant with the Wi-F® or any other standard to be established and communicates wirelessly with the communications unit 6 of the tool 2. The display unit 82 and the operating unit 83 may be implemented integrally as a touchscreen panel, for example. The control unit 84 may include a microcomputer, for example, and may be configured to control the communications unit 81, the display unit 82, and the operating unit 83. The storage unit 85 may be implemented as a semiconductor memory such as a flash memory.

In this variation, the image capturing unit 5 not only outputs the captured image to the image processing unit 33 but also transmits the captured image to the setting terminal 8 via the communications unit 6 as well. In response, the control unit 84 of the setting terminal 8 has the captured image transmitted from the tool 2 displayed on the display unit 82. This allows the worker to confirm, on the display unit 82 of the setting terminal 8, the image being captured by the image capturing unit 5 or a still image generated by the image capturing unit 5, for example. In addition, entering a command through the operating unit 83 allows a target torque value, associated with the still image, to be entered. The control unit 84 makes the storage unit 85 store the still image transmitted from the tool 2 and the target torque value thus entered in association with each other.

The control unit 84 transmits the still image and torque value, which are stored in the storage unit 85, to the tool 2 via the communications unit 81. The registration unit 36 of the tool 2 performs the image storage processing of making the image storage unit 41 store, as a reference image, the still image transmitted from the setting terminal 8 and also performs the torque storage processing (or target value storage processing) of making the torque storage unit 42 store the target torque value transmitted from the setting terminal 8.

In addition, the decision unit 35 transmits the decision result of the fastening work to the setting terminal 8 via the communications unit 6. In this variation, the storage unit 85 of the setting terminal 8 performs the function of the result storage unit 43*a*. The control unit 84 performs result storage processing of making the result storage unit 43*a* store the result of decision made by the decision unit 35 and transmitted from the tool 2. In addition, the tool-end control unit 3 makes the display unit 82 display the decision result stored in the result storage unit 43*a*. This allows the worker to confirm, as a list, the results of decision made by the decision unit 35 for the respective work objects.

The setting terminal 8 does not have to be a mobile telecommunications device portable for the worker. Alternatively, the setting terminal 8 may also be a server with the ability to communicate with the communications unit 6 of the tool 2, for example.

(2.1.1) Exemplary Operation

Figure 6:
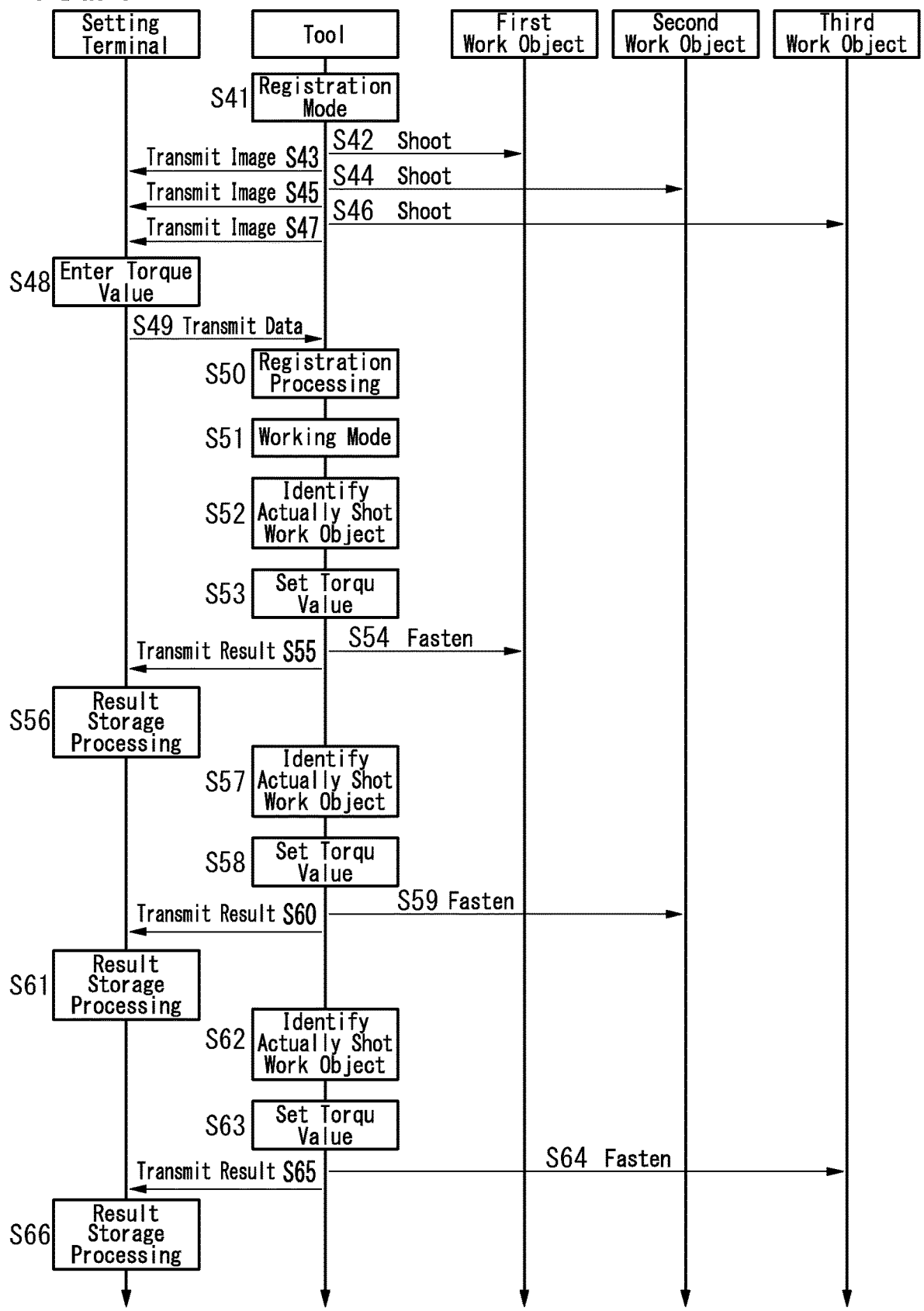
FIG. 6 shows the sequence of operations to be performed by the tool system according to the first variation.

Next, an exemplary operation of the tool system 1*a* according to this variation will be described with reference to FIG. 6.

First of all, the worker sets the operation mode of the tool 2 at the registration mode (in Step S41).

The worker directs the image capturing unit 5 toward the first work object of the first product and presses down the shutter release button of the control panel 231 to shoot the first work object (in Step S42). This allows a first still image of the first work object to be generated and transmitted to the setting terminal 8 (in Step S43). The worker shoots the second and third work objects in the same way as the first work object (in Steps S44 and S46). This allows a second still image of the second work object and a third still image of the third work object to be generated and transmitted to the setting terminal 8 (in Steps S45 and S47, respectively).

The worker confirms the first, second, and third still images on the display unit 82 and enters, through the operating unit 83, first, second, and third target torque values for the first, second, and third still images, respectively (in Step S48). On entering the first, second, and third torque values, the worker has the data (including the first, second, and third still images and the first, second, and third target torque values) transmitted from the setting terminal 8 to the tool 2 (in Step S49).

The registration unit 36 of the tool 2 performs the image storage processing of making the image storage unit 41 store, as the first, second, and third reference images, the first, second, and third still images transmitted from the setting terminal 8, and also performs the torque storage processing of making the torque storage unit 42 store the first, second, and third target torque values (in Step S50).

Next, the worker operates the control panel 231 to switch the operation mode of the tool 2 into the working mode (in Step S51). Then, the worker performs the work of assembling the product with the operation mode of the tool 2 set at the working mode.

The worker directs the image capturing unit 5 toward the first work object of the product. The image processing unit 33 performs image processing to identify the first work object as the actually shot work object (in Step S52). This allows the driving control unit 31 to set a first target torque value associated with the first work object as the torque setting (in Step S53).

On confirming that the first work object has been identified by the notification unit 211, the worker performs the fastening work of attaching the fastening member onto the first work object (in Step S54).

The decision unit 35 transmits a first decision result, indicating whether or not the fastening torque when the fastening member is attached to the first work object is a normal one, to the setting terminal 8 via the communications unit 6 (in Step S55). The control unit 84 of the setting terminal 8 performs result storage processing of making the result storage unit 43*a* store the first decision result in association with the first work object (in Step S56).

In addition, the worker sequentially performs the fastening work on the second and third work objects in this order in the same working procedure as the first work object. Specifically, the worker directs the image capturing unit 5 toward the second work object. This allows the image processing unit 33 to identify the second work object as the actually shot work object (in Step S57). The driving control unit 31 sets a second target torque value associated with the second work object as the torque setting (in Step S58). The worker performs the fastening work of attaching the fastening member onto the second work object (in Step S59). The decision unit 35 transmits a second decision result, indicating whether or not the fastening torque during the fastening work in Step S59 is a normal one, to the setting terminal 8 via the communications unit 6 (in Step S60). The control unit 84 of the setting terminal 8 performs result storage processing of making the result storage unit 43a store the second decision result (in Step S61).

When the fastening work on the second work object is completed, the worker performs the fastening work on the third work object. Specifically, the worker directs the image capturing unit 5 toward the third work object. This allows the image processing unit 33 to identify the third work object as the actually shot work object (in Step S62). The driving control unit 31 sets a third target torque value associated with the third work object as the torque setting (in Step S63). The worker performs the fastening work of attaching the fastening member onto the third work object (in Step S64). The decision unit 35 transmits a third decision result, indicating whether or not the fastening torque during the fastening work in Step S64 is a normal one, to the setting terminal 8 via the communications unit 6 (in Step S65). The control unit 84 of the setting terminal 8 performs result storage processing of making the result storage unit 43a store the third decision result (in Step S66).

In the exemplary operation described above, the setting terminal 8 transmits the captured image back to the tool 2 in Step S49. However, this is only an example and should not be construed as limiting. Alternatively, the setting terminal 8 may also be configured to transmit identification information about the captured image to the tool 2. In that case, the registration unit 36 performs, based on the identification information, image storage processing and torque storage processing.

Optionally, the tool 2 may have a browser capability as well. The browser capability allows the registration unit 36 to perform the torque storage processing by accessing the storage unit 85 of the setting terminal 8, acquiring a target torque value, and storing the target torque value thus acquired in the torque storage unit 42. The registration unit 36 also performs the image registration processing of making the image storage unit 41 store, as reference images, the respective still images generated in the processing steps S42, S44, and S46 of the exemplary operation described above. This allows the processing step S49 of transmitting the still image from the setting terminal 8 back to the tool 2 in the exemplary operation described above to be omitted.

Optionally, the tool 2 may have a Web server capability and the setting terminal 8 may have the browser capability as well. In that case, the browser capability of the setting terminal 8 allows the tool 2 to be accessed and the target torque value to be registered or changed.

From the second product and on, the worker will also perform the assembling work with the operation mode of the tool 2 set at the working mode.

According to this variation, the tool 2 may also be configured to make the trigger switch 221 serve as a shutter release button when the operation mode is the registration mode.

(2.2) Second Variation

Figure 7:
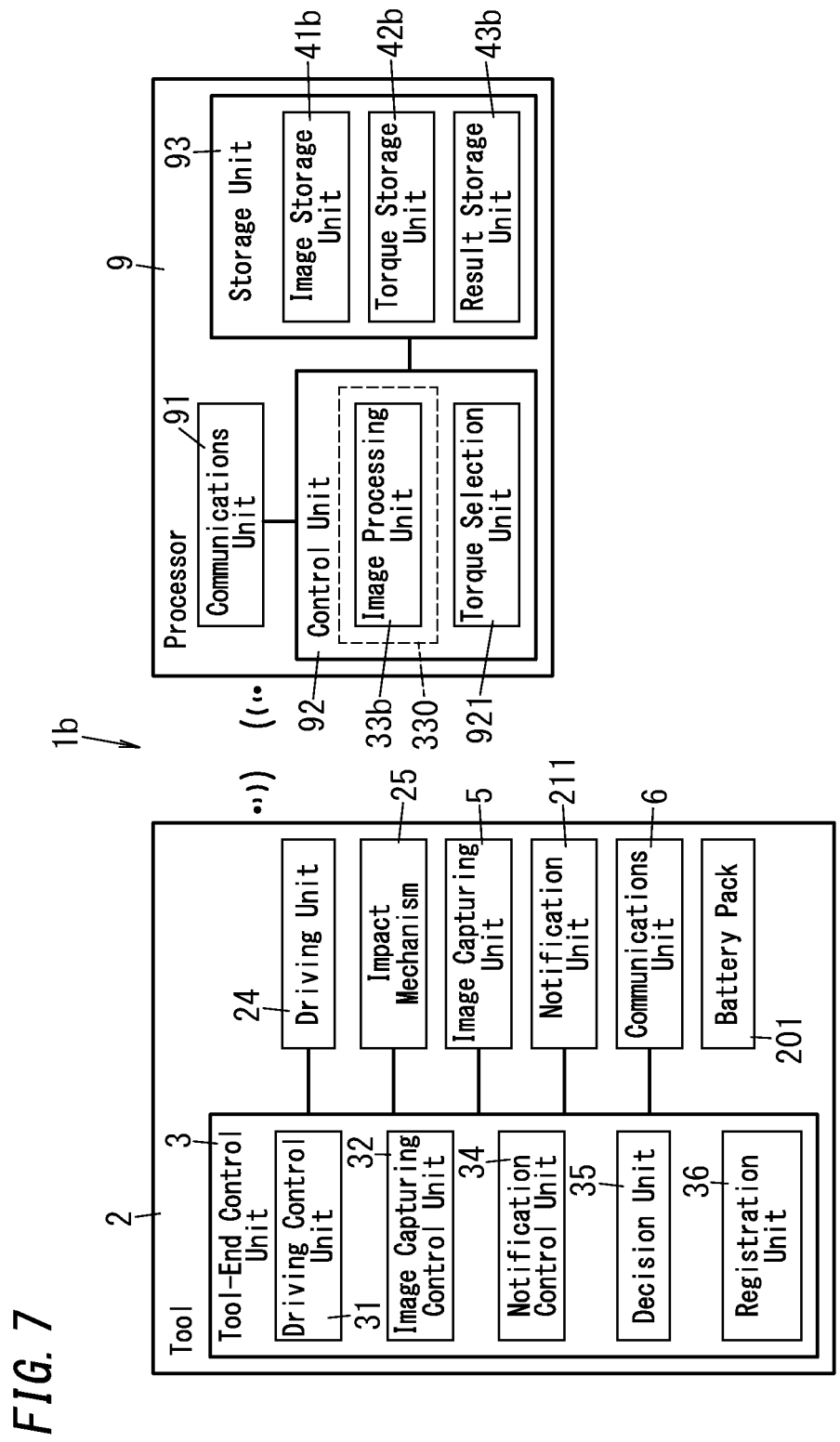
FIG. 7 is a block diagram of a tool system according to a second variation of the first embodiment of the present disclosure.

FIG. 7 is a block diagram of a tool system 1b according to a second variation. The tool system 1b according to this variation includes a processor 9, which is a major difference from the tool system 1 according to the exemplary embodiment described above. In this variation, the processor 9 provided separately from the tool 2 includes an image processing unit 33b (serving as the identification unit 330). The processor 9 is configured to identify the actually shot work object.

The tool 2 according to this variation includes the driving unit 24, the tool-end control unit 3, the image capturing unit 5, the battery pack 201, and the communications unit 6. The tool-end control unit 3 performs the functions of the driving control unit 31, the image capturing control unit 32, the notification control unit 34, the decision unit 35, and the registration unit 36 by making a processor execute a program stored in a memory. That is to say, the tool-end control unit 3 does not perform the function of the image processing unit 33.

The communications unit 6 is a communications module that enables wireless communication compliant with the Wi-Fi® or any other standard to be established and is housed in the body 20.

The processor 9 may be implemented as a server, for example, and includes a communications unit 91, a control unit 92, and a storage unit 93.

The communications unit 91 is a communications module for communicating with the communications unit 6 of the tool 2. Note that if the communications unit 91 has no wireless communication capability, then the communications unit 91 may also be configured to communicate with the communications unit 6 via a communications device that performs interconversion between wireless communication and wired communication. The control unit 92 may include a microcomputer, for example, and may perform the functions of the image processing unit 33b and a torque selection unit 921 by making its processor execute the program stored in its memory. The storage unit 93 may be implemented as a semiconductor memory such as a flash memory, and performs the functions of an image storage unit 41b, a torque storage unit 42b (target value storage unit), and a result storage unit 43b.

In this variation, the image capturing unit 5 outputs (transmits) the captured image to the processor 9 via the communications unit 6. In the processor 9, the image processing unit 33b sequentially performs pattern matching processing on a plurality of reference images stored in the image storage unit 41b with respect to the image captured by, and transmitted from, the image capturing unit 5 of the tool 2, thereby identifying the work object shot by the image capturing unit 5 (actually shot work object).

The torque selection unit 921 searches the torque storage unit 42b to select a target torque value associated with the actually shot work object identified by the image processing unit 33b, and then transmits the target torque value to the tool 2 via the communications unit 91. The driving control unit 31 of the tool 2 sets the target torque value selected by the torque selection unit 921 of the processor 9 as the torque setting.

Also, the decision unit 35 transmits the decision result of the fastening work to the processor 9 via the communications unit 6. The decision result transmitted from the decision unit 35 is stored in the result storage unit 43b of the processor 9.

Optionally, the processor 9 may be implemented as a cloud computing system. The functions of the image processing unit 33b, the torque selection unit 921, the image storage unit 41b, the torque storage unit 42b, and the result storage unit 43b may be distributed in multiple devices as well.

The processor 9 may also be configured to communicate with a plurality of tools 2 such that the image processing unit 33b performs image processing on the image captured by the image capturing unit 5 of each of those tools 2 to identify the actually shot work object. That is to say, the image processing unit 33b may identify the work objects (actually shot work objects) shot in the images captured by the respective image capturing units 5 of the plurality of tools 2, and the torque selection unit 921 may transmit respective target torque values to those tools 2. This allows the single processor 9 to provide torque settings for the respective work objects shot by the image capturing units 5 of a plurality of tools 2.

(2.3) Other Variations

Next, other variations of the tool system 1 will be enumerated one after another.

The storage unit 4 may store working procedure data indicating a predetermined order of working for a plurality of work objects. In that case, the image processing unit 33 selects, in accordance with the working procedure, a reference image for use in image processing (pattern matching) out of the plurality of reference images. Specifically, the image processing unit 33b preferentially selects one reference image, corresponding to a work object to be processed in a forthcoming working process step, out of the plurality of reference images. As used herein, the "forthcoming work object" is a work object to be processed next to the work object that has been identified last time. The image processing unit 33 performs image processing of comparing the reference image selected as template data with the captured image. That is to say, the image processing unit 33 selects the reference image by predicting the work object to be shot in the captured image next time in accordance with the working procedure. This allows the image processing unit 33 to identify, in a shorter time, the work object shot in the captured image.

Optionally, the image processing unit 33 may also be configured to determine the type of the socket 242 attached to the tool 2 by performing image processing on the image captured by the image capturing unit 5. As used herein, the "type" is a piece of information for distinguishing different parts from each other, and includes at least one piece of information about the size (dimension or length), shape, or material. In this embodiment, the image processing unit 33 is configured to determine the length of the socket 242 attached to the tool 2. The driving control unit 31 corrects, according to the length of the socket 242, the target torque value and sets the target torque value thus corrected as the torque setting. For example, the driving control unit 31 corrects a target torque value associated with the actually shot work object by multiplying the target torque value by a coefficient corresponding to the length of the socket 242 and sets the target torque value thus corrected as the torque setting. That is to say, the driving control unit 31 controls the driving unit 24 such that the fastening torque becomes equal to the corrected target torque value. This reduces dispersion in fastening torque according to the length of the socket 242.

Alternatively, the driving control unit 31 may also be configured to determine the torque setting according to the length (or type), detected by the image processing unit 33, of the socket 242. In the storage unit 4, stored are torque values corresponding one to one to various lengths of the socket 242. The driving control unit 31 acquires, from the storage unit 4, a torque value corresponding to the length, determined by the image processing unit 33, of the socket 242 and sets a value, based on the torque value thus acquired, as the torque setting. For example, the driving control unit 31 may set the torque value, acquired from the storage unit 4, as the torque setting. This allows the fastening work to be performed at a torque value corresponding to the type of the socket 242.

The image capturing unit 5 may be configured to generate a still image when the fastening work is completed. The decision unit 35 makes the result storage unit 43 store the still image generated by the image capturing unit 5 in association with the decision result. This allows the worker to confirm the still image of a work object, of which the fastening torque has turned out to be insufficient, for example.

The image capturing unit 5 does not have to be provided for the barrel 21 of the body 20 but may also be provided, for example, for the attachment member 23 of the body 20 or the battery pack 201.

The notification unit 211 does not have to be implemented as an LED but may also be implemented as, for example, a buzzer for emitting a sound when the image processing unit 33 identifies the actually shot work object.

Optionally, each product may be provided with unique marks (such as imprints) near the individual work objects. This allows the image processing unit 33 to identify the work objects by reference to these marks, thus improving the accuracy of the identification.

Furthermore, in the example described above, the tool 2 is an impact wrench and the work value is a fastening torque. However, this is only an example and should not be construed as limiting. Alternatively, the work value may also be the number of revolutions of the driving unit 24 (motor). Using the number of revolutions as a work value requires a target value of the number of revolutions to be stored in a target value storage unit. In that case, the driving control unit 31 controls the driving unit 24 such that the work value becomes equal to a number of revolutions setting.

Furthermore, in the example described above, the tool 2 is an impact wrench. However, the tool 2 does not have to be an impact wrench but may also be a nut runner or an oil pulse wrench, for example. Alternatively, the tool 2 may also be a screwdriver (impact screwdriver) for use to fasten screws (as fastening members), for example. In that case, a bit (such as a screwdriver bit) is attached to the tool 2 instead of the socket 242. Furthermore, the tool 2 does not have to be configured to be powered by the battery pack 201 but may also be configured to be powered by an AC power supply (commercial power supply). Moreover, the tool 2 does not have to be an electric tool but may also be an air tool including an air motor (driving unit) to be operated by compressed air (power) supplied from an air compressor (power source).

Furthermore, in the example described above, the work object is a local portion around a screw hole to which a fastening member is attached (a portion to be fastened). However, this is only an example and should not be construed as limiting. Alternatively, the work object may also be a module, part, or product with a plurality of portions to be fastened. In that case, the plurality of portions to be fastened of a single work object may have either the same target torque value or mutually different target torque values.

(3) Second Embodiment

Next, a tool system 1c according to a second embodiment will be described. In the following description, any constituent element of this second embodiment, having the same function as a counterpart of the tool system 1 (1a, 1b)

according to the first embodiment described above, will be designated by the same reference numeral as that counterpart's, and a detailed description thereof will be omitted herein.

Figure 8:
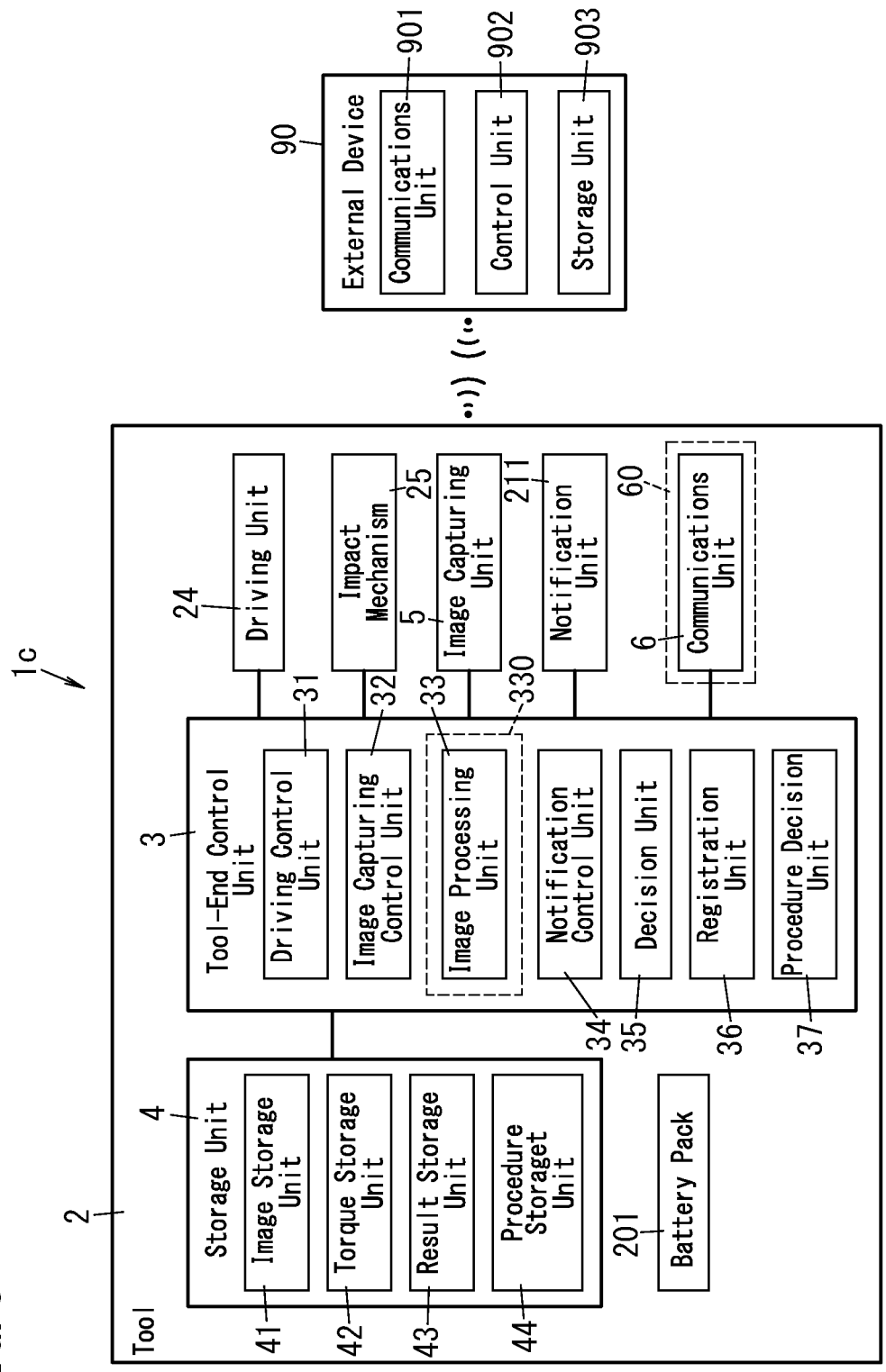
FIG. 8 is a block diagram of a tool system according to a second embodiment of the present disclosure.

FIG. 8 is a block diagram of a tool system 1c according to the second embodiment. The tool system 1c according to this embodiment deactivates, when the actually shot work object identified by the identification unit 330 (image processing unit 33) does not conform to the working procedure, the driving unit 24 of the tool 2, which is a major difference from the tool system 1 (1a, 1b) according to the first embodiment.

A tool 2 according to this embodiment includes the tool-end control unit 3, the storage unit 4, the driving unit 24, the impact mechanism 25, the image capturing unit 5, the notification unit 211, the communications unit 6, and the battery pack 201.

The tool-end control unit 3 includes not only the driving control unit 31, the image capturing control unit 32, the image processing unit 33, the notification control unit 34, the decision unit 35, and the registration unit 36, but also a procedure decision unit 37. The storage unit 4 includes not only the image storage unit 41, the torque storage unit 42, and the result storage unit 43, but also a procedure storage unit 44.

The procedure storage unit 44 stores data about either a single working procedure or multiple working procedures. Supposing a series of working process steps to be done on either a single work object or plurality of work objects is herein referred to as a "single working process," the working procedure refers to the order of working process steps to be performed on the single work object or the plurality of work objects during the working process. In other words, the working procedure indicates by which working process, out of the single or plurality of working processes, a given work object needs to be processed, and also indicates how many working process steps should be performed before the given work object is processed by the working process.

The procedure decision unit 37 determines whether or not the work object (actually shot work object) identified by the image processing unit 33 conforms to a predefined working procedure (hereinafter referred to as a "reference working procedure"). Specifically, the procedure decision unit 37 extracts data about a working procedure (indicating a particular working process and a particular working process step) for the actually shot work object identified by the image processing unit 33, from the procedure storage unit 44. Then, the procedure decision unit 37 determines whether or not the particular working process and particular working process step extracted from the procedure storage unit 44 conform to the predefined reference working procedure (indicating a predefined working process and a predefined working process step).

For example, suppose the reference working procedure (indicating the predefined working processes and working process step) predefined for the procedure decision unit 37 indicates "the third working process step of the first working process." In addition, suppose the working procedure (indicating a particular working process and a particular working process step) that the procedure decision unit 37 has extracted from the procedure storage unit 44 for the actually shot work object identified by the image processing unit 33 also indicates "the third working process step of the first working process." In that case, the procedure decision unit 37 determines that the actually shot work object identified by the image processing unit 33 should conform to the reference working procedure.

On the other hand, suppose the working procedure (indicating a particular working process and a particular working process step) that the procedure decision unit 37 has extracted from the procedure storage unit 44 for the actually shot work object identified by the image processing unit 33 indicates "the fourth working process step of the first working process." In that case, the procedure decision unit 37 determines that the actually shot work object identified by the image processing unit 33 should not conform to the reference working procedure.

The reference working procedure set by the procedure decision unit 37 is changed according to the actually shot work object identified by the image processing unit 33. For example, if the product (target) corresponding to the actually shot work object identified by the image processing unit 33 has been changed into another product with a different working process, then the reference working procedure is changed accordingly into the one corresponding to the latter product.

In this embodiment, when the image processing unit 33 identifies a work object that should be processed in the "first" working process step, then the procedure decision unit 37 changes the reference working procedure such that the work object should be processed in the first working process step of the working process corresponding to the actually shot work object identified by the image processing unit 33. That is to say, when the reference working procedure is changed, the work object will be processed in the first working process step according to the modified reference working procedure.

Also, if the predefined reference working procedure indicates the first working process step, then the procedure decision unit 37 is allowed to change the reference working procedure. In other words, if the reference working procedure predefined for the procedure decision unit 37 indicates an intermediate working process step (i.e., from the second working process step and on), then the reference working procedure may not be changed. Therefore, even if the image processing unit 33 identifies a work object that should be processed in the first working process step of another working process during an intermediate working process step of the reference working procedure predefined for the procedure decision unit 37, the reference working procedure is not changed.

Note that the reference working procedure does not have to be set as described above. For example, the reference working procedure may also be set based on product shots that are captured images generated by the image capturing unit 5. In that case, the image processing unit 33 identifies a product by subjecting a captured image, in which the product has been shot either partially or entirely, to image processing. The procedure decision unit 37 sets the reference working procedure by defining the first working process step for a single or a plurality of work objects that the product identified by the image processing unit 33 has.

Also, when the work on the work object conforming to the reference working procedure is completed, the procedure decision unit 37 proceeds to the next working process step according to the predefined reference working procedure. Furthermore, if the working process step that has just been done turns out to be the last working process step, then the procedure decision unit 37 returns to the first working process step. For example, if the reference working procedure indicates the "third working process step of the first working process" and when the fastening work on the work object conforming to this reference working procedure is done, the procedure decision unit 37 proceeds to the "fourth working process step of the first working process" as the next working process step according to the reference working procedure. Also, when the fastening work on the work object conforming to the reference working procedure indicating the "last working process step of the first working process" is completed, the procedure decision unit 37 returns to the "first working process step of the first working process" according to the reference working procedure.

In the tool 2 according to this embodiment, the tool-end control unit 3 performs a predetermined type of processing in accordance with the result of decision made by the procedure decision unit 37. Examples of the predetermined processing include regulating the operation of the driving unit 24, sending notification to the worker, and sending notification to an external device 90.

Specifically, if the result of decision made by the procedure decision unit 37 indicates nonconformity, i.e., the actually shot work object identified by the image processing unit 33 does not conform to the reference working procedure, the driving control unit 31 does not activate the driving unit 24 even when the trigger switch 221 (see FIG. 2) is pulled. In other words, the driving unit 24 may be activated only when the result of decision made by the procedure decision unit 37 indicates conformity. Therefore, even if the tool 2 is set on a work object that does not conform to the reference working procedure, the driving unit 24 remains inactive, thus disabling the fastening work. This reduces the chances of the work being performed in a wrong working order. Optionally, the tool 2 may also be configured to keep the trigger switch 221 locked and unusable if the result of decision made by the procedure decision unit 37 indicates nonconformity.

In addition, if the result of decision made by the procedure decision unit 37 indicates nonconformity, then the notification control unit 34 lights the notification unit 211. In this embodiment, the notification unit 211 also performs the function of a worker notification unit for notifying the worker that the tool 2 is set on a work object that does not conform to the reference working procedure. The notification control unit 34 lights the notification unit 211 in a different color or different lighting pattern when the result of decision made by the procedure decision unit 37 indicates nonconformity from when the image processing unit 33 has identified the actually shot work object. For example, if the result of decision made by the procedure decision unit 37 indicates nonconformity, the notification control unit 34 may light the notification unit 211 in red. On the other hand, if the image processing unit 33 has identified the actually shot work object, then the notification control unit 34 may light the notification unit 211 in green. This allows the worker to see, by checking the lighting state of the notification unit 211 (worker notification unit) with the eyes, whether the work object conforms to the reference working procedure or not. Optionally, when the trigger switch 221 is pulled with the result of decision made by the procedure decision unit 37 indicating nonconformity, the notification control unit 34 may light the notification unit 211.

The notification unit 211 may be implemented as a buzzer for emitting a sound, for example. In that case, the notification control unit 34 makes the notification unit 211 emit a different sound when the result of decision made by the procedure decision unit 37 indicates nonconformity from when the image processing unit 33 has identified the actually shot work object. In the embodiment described above, the notification unit 211 performs the function of the worker notification unit as well. However, this is only an example and should not be construed as limiting. Alternatively, a worker notification unit may be provided separately from the notification unit 211.

Also, if the result of decision made by the procedure decision unit 37 indicates nonconformity, the notification control unit 34 has a notification signal transmitted from the communications unit 6 to the external device 90. That is to say, according to this embodiment, the communications unit 6 performs the function of a device notification unit 60 for sending notification to the external device 90. The notification signal includes data (error data) about the actually shot work object, identified by the image processing unit 33, for which the procedure decision unit 37 has indicated nonconformity, and data about the reference working procedure. Optionally, the notification control unit 34 may make the communications unit 6 transmit a notification signal when the trigger switch 221 is pulled with the result of decision made by the procedure decision unit 37 indicating nonconformity.

The external device 90 may be implemented as a server, for example, and includes a communications unit 901, a control unit 902, and storage unit 903.

The communications unit 901 is a communications module for communicating with the communications unit 6 of the tool 2. Note that if the communications unit 901 has no wireless communication capability, then the communications unit 901 may also be configured to communicate with the communications unit 6 via a communications device that performs interconversion between wireless communication and wired communication. The control unit 902 may include a microcomputer, for example. The control unit 902 may store error data (i.e., data indicating the actually shot work object and the reference working procedure) in the storage unit 903 in response to a notification signal received by the communications unit 901. The history of the error data is stored in the storage unit 903.

This allows the administrator of the tool system 1c to identify, by reference to the history of the error data stored in the storage unit 903 of the external device 90, a work object that has often been processed by the worker in a wrong working order and prompt him or her to revise the reference working procedure. Optionally, the administrator of the tool system 1c may also tell the worker to take care when working on a work object that has often been processed in a wrong working order.

Optionally, the communications unit 6 (device notification unit 60) may be connected via cables to the communications unit 901 and may be configured to transmit the notification signal to the external device 90 by wired communication. Also, the device notification unit 60 does not have to be configured to notify the external device 90 by sending the notification signal thereto. Alternatively, the device notification unit 60 may store the history of the error data in a storage medium, such as a memory card, removable from the tool 2 and may notify the external device 90 via the storage medium.

(3.2) Exemplary Operation

Next, an exemplary operation of the tool system 1c according to this embodiment will be described. In the following description, it will be described how the tool system 1c may operate so as to allow the worker to do assembling work on a plurality of products in an assembly line. In addition, multiple types of products are assembled by mass customization so as to deal with various options that may or may not be picked up in a single assembly line. Each product includes a plurality of work objects and each type of product requires a different working process. That is to say, the plurality of products are associated with different reference working procedures on a type-by-type basis.

The worker sets the tool 2 on a work object to be processed in the first working process step. This allows the image processing unit 33 to identify the work object. When the work object is identified, the target torque value is set at the torque setting and the reference working procedure is also set for this work object (actually shot work object). Then, the worker performs fastening work by pulling the trigger switch 221.

When the fastening work on the work object is done, the worker sets the tool 2 on a work object to be processed in the next working process step and performs the fastening work on the work objects sequentially. Suppose the worker has followed a wrong working procedure by mistake to set the tool 2 on a work object that does not conform to the reference working procedure. In that case, the result of decision made by the procedure decision unit 37 is nonconformity, the driving unit 24 has its operation restricted (deactivated), and the notification unit 211 is lit. This allows the worker to notice that he or she has followed a wrong working procedure. In addition, a notification signal is sent from the tool 2 to the external device 90 such that the external device 90 is provided with data about the work object for which the worker has followed the wrong working procedure. In that case, the worker may resume and continue the work by resetting the tool 2 on a work object that conforms to the correct working procedure.

When the fastening work on a work object to be processed in the last working process step is completed, the working process step according to the reference working procedure is reset into the first one. If the product to be processed next is the same type of product as the previous one, the reference working procedure is not changed. Then, the worker performs the fastening work on the work objects sequentially in the same way as described above.

Meanwhile, in some cases, the product to be processed next (hereinafter referred to as a "second object") may be a different type of product, and may require a different working process, from the previous product (hereinafter referred to as a "first object"). In that case, when the tool 2 is set on the work object to be processed in the first working process step for this next product, the reference working procedure is changed from a first reference working procedure for the previous product (i.e., the first object) into a second reference working procedure for the next product (i.e., the second object). Furthermore, the current working process step becomes the first working process step according to the second reference working procedure. Then, the worker performs the fastening work on the work objects sequentially in the same way as described above.

In the example described above, the (first and second) targets are supposed to be products. However, this is only an example and should not be construed as limiting. Alternatively, the (first and second) targets may also be modules, parts, or anything else.

(4) Variation

Next, a tool system 1*d* according to a variation of the second embodiment will be described. In the following description, any constituent element of this variation, having the same function as a counterpart of the tool system 1*c* described above, will be designated by the same reference numeral as that counterpart's, and a detailed description thereof will be omitted herein.

Figure 9:
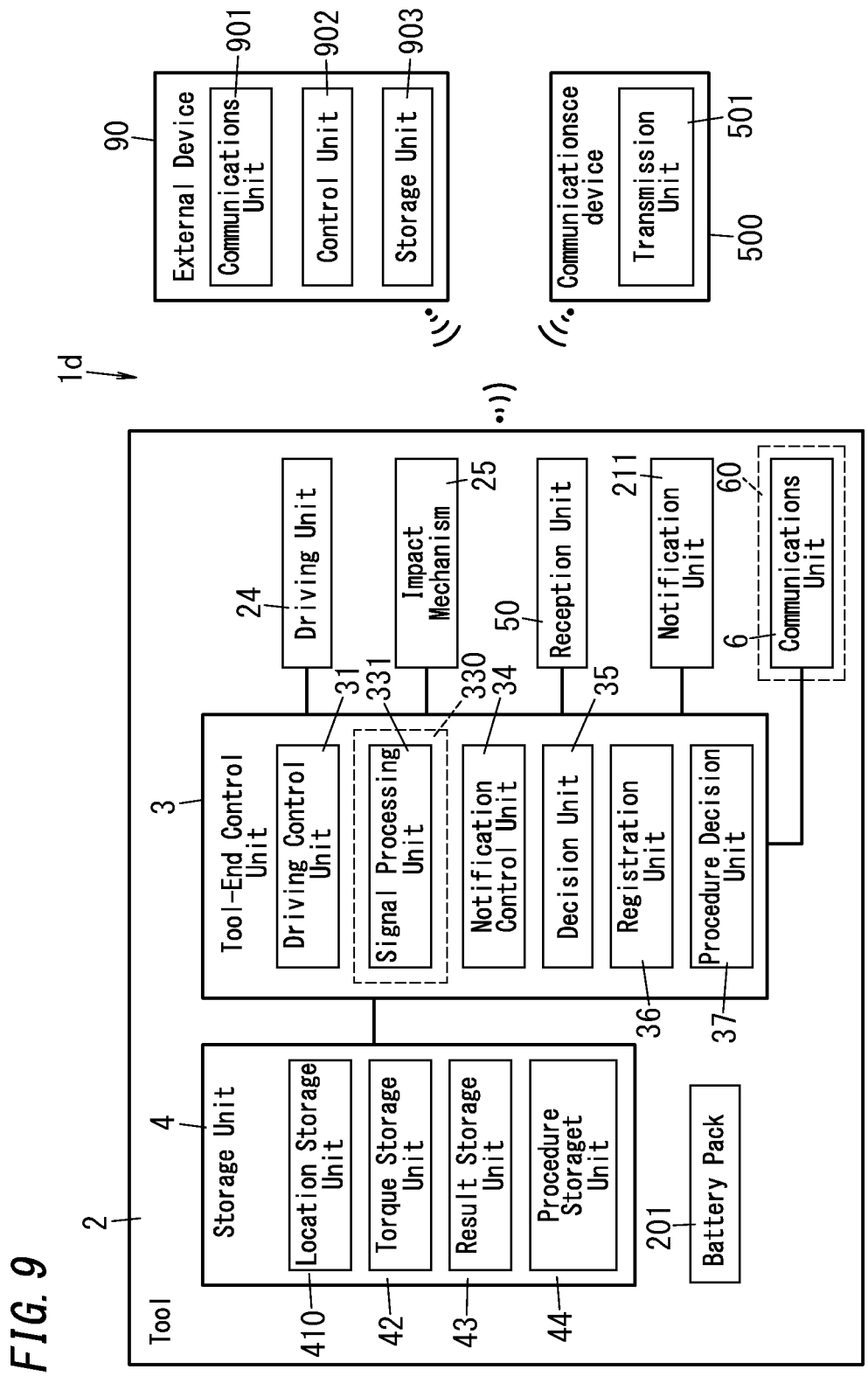
FIG. 9 is a block diagram of a tool system according to a variation of the second embodiment of the present disclosure.

FIG. 9 is a block diagram of the tool system 1*d* according to this variation. The tool system 1*d* according to this variation includes a reception unit 50 provided for the tool 2 and a transmission unit 501 provided for a communications device 500. The tool system 1*d* according to this variation identifies the current work object by determining the location of the tool 2 in accordance with reception information about reception of a wireless signal at the reception unit 50, which is a major difference from the tool system 1*c* described above.

In the tool system 1*d* according to this variation, the tool 2 further includes the reception unit 50. The tool-end control unit 3 includes the driving control unit 31, the notification control unit 34, the decision unit 35, the registration unit 36, the procedure decision unit 37, and a signal processing unit 331. The storage unit 4 includes the torque storage unit 42, the result storage unit 43, the procedure storage unit 44, and a location storage unit 410. In this variation, the signal processing unit 331 performs the function of an identification unit 330 for identifying the current work object on which the tool 2 is set in place. That is to say, in this variation, the identification unit 330 (signal processing unit 331) uses, as a sensor, the reception unit 50 provided for the tool 2 and identifies, based on the output (reception information) of the sensor (reception unit 50), the current work object on which the tool 2 is set in place.

Figure 10A:
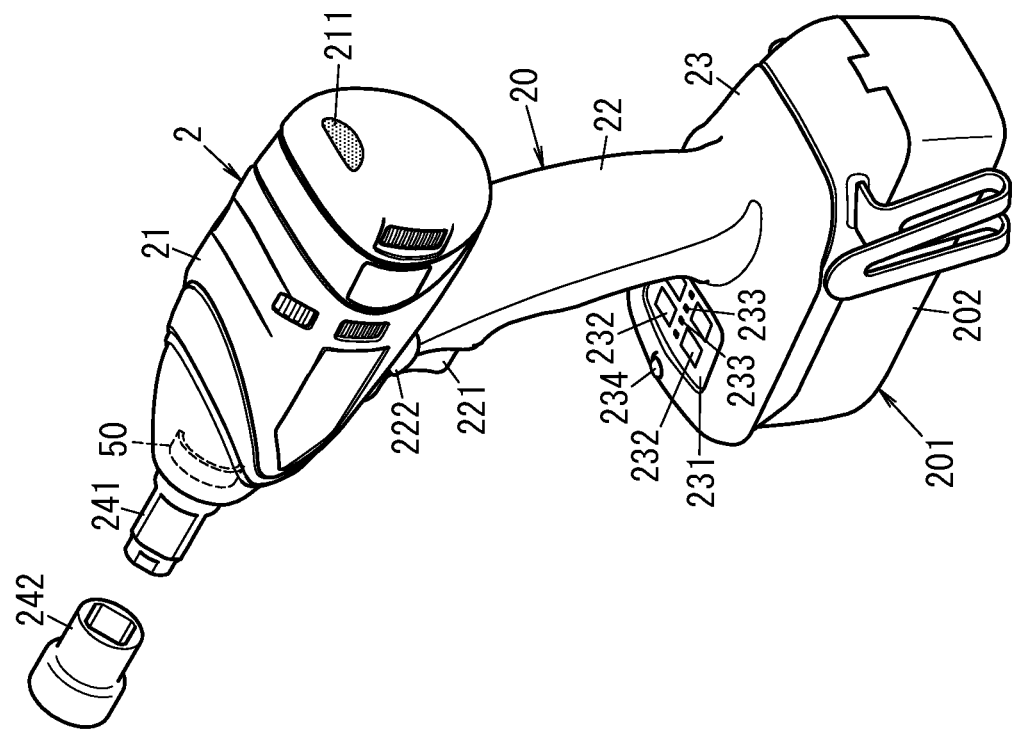
FIG. 10A is a perspective view illustrating the appearance, as viewed from the first direction, of a tool included in the tool system.
Figure 10B:
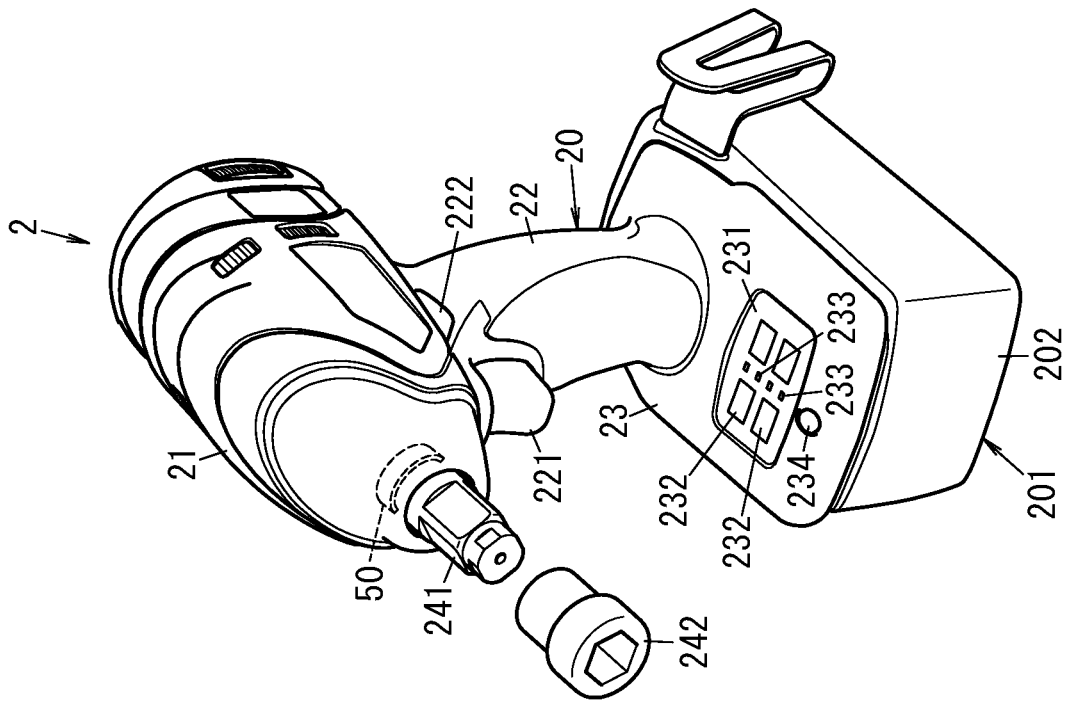
FIG. 10B is a perspective view illustrating the appearance, as viewed from the second direction, of the tool included in the tool system.

The reception unit 50 includes a plurality of (e.g., three) antennas. As shown in FIG. 10, the reception unit 50 is housed in the barrel 21 of the body 20 of the tool 2. In this variation, the reception unit 50 is arranged along the output shaft 241. That is to say, the reception unit 50 is arranged within a predetermined range from the output shaft 241. This makes less difference in the relative position of the reception unit 50 with respect to the work object depending on whether the worker is holding the tool 2 in his or her right hand or left hand while working on a given work object. In addition, the reception unit 50 is arranged closer to the tip of the output shaft 241 in the barrel 21. This also reduces a shift in the relative position of the reception unit 50 with respect to the work object.

Each of the antennas of the reception unit 50 receives a wireless signal from the transmission unit 501 of the communications device 500 via radio waves. The wireless signal to be transmitted and received between the reception unit 50 and the transmission unit 501 may be compliant with the Bluetooth® standard, for example. The plurality of antennas may have the same property (in terms of directivity and gain, for example) or may also have mutually different properties without limitation. Also, the plurality of antennas may be of the same type or may also be different types without limitation.

The communications device 500 is provided at a different location from the tool 2. In this embodiment, the communications device 500 is provided for each product. Note that the communications device 500 is attachable to, and removable from, each product. The communications device 500 may be removed from each product before the product is shipped or may also remain attached to the product. When still attached to the product even after the product has been shipped, the communications device 500 may be used to provide traceability of various kinds of information including manufacturing information and product information.

The communications device 500 includes the transmission unit 501. The transmission unit 501 includes an antenna for transmitting a wireless signal. The communications device 500 transmits the wireless signal at regular intervals from the transmission unit 501 toward the reception unit 50 provided for each tool 2.

Optionally, a plurality of communications devices 500 may be provided for each product and each of the plurality of communications devices 500 may transmit a wireless signal to its associated tool 2. In addition, the communications device 500 does not have to be provided in a product, but may also be provided for a palette on which the product is mounted, or a ceiling, wall, or column of the factory, for example.

The signal processing unit 331 determines, based on reception information about reception of the wireless signal at the reception unit 50, the location of the tool 2, thereby identifying the current work object. Specifically, the signal processing unit 331 determines the location of the tool 2 by three point positioning method based on the reception information provided by the reception unit 50. Examples of the reception information include information about the time lag between respective timings when the plurality of antennas have received the wireless signal and information about the strengths of the wireless signal received at the respective antennas. As used herein, the "location of the tool 2" refers to the relative location of the tool 2 (reception unit 50) with respect to the communications device 500. For example, the signal processing unit 331 obtains, based on the reception information provided by the reception unit 50, three-axis coordinates (along the x, y, and z axes) with respect to the location of the communications device 500. The signal processing unit 331 identifies the current work object based on the location data of the tool 2 thus determined and data about a plurality of reference locations stored in the location storage unit 410.

The location storage unit 410 stores the data about the plurality of reference locations in association with the plurality of work objects. As used herein, the "data about a reference location" refers to data about the location of an associated work object. Also, as used herein, the "location of a work object" refers to the relative location of the work object with respect to the communications device 500. Furthermore, the data about the reference location does not indicate a local location of the work object but indicates the area of a predetermined range covering the location of the work object.

The signal processing unit 331 searches the data, stored in the location storage unit 410, about a plurality of reference locations for data about a reference location including data about the location of the tool 2 positioned. Then, the signal processing unit 331 identifies a work object associated with the data about the reference location as the current work object on which the tool 2 is currently set in place.

In this variation, the registration unit 36 performs, instead of the image registration processing described above, location registration processing of making the location storage unit 410 store data about the plurality of reference locations. The registration unit 36 makes, while performing the location registration processing, the location storage unit 410 store, as the reference location data, location data falling within a predetermined range covering the location of the tool 2 determined by the signal processing unit 331. Specifically, in a situation where the operation mode of the tool 2 is the registration mode, when the trigger switch 221 turns ON, the signal processing unit 331 determines the location of the tool 2. The registration unit 36 makes the location storage unit 410 store, as the reference location data, the location data falling within the predetermined range covering the location of the tool 2 determined by the signal processing unit 331.

Figure 11:
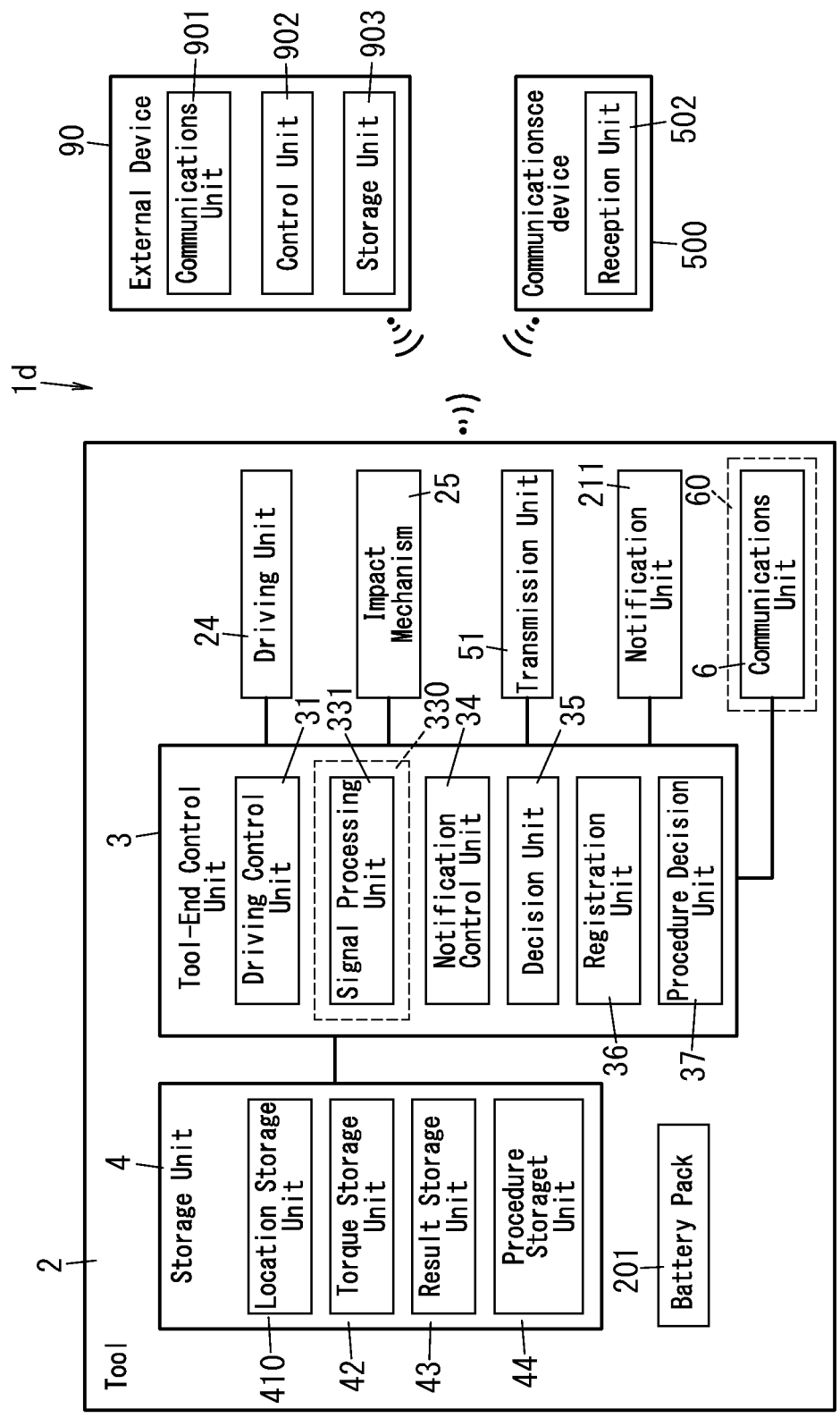
FIG. 11 is a block diagram of a tool system according to another variation of the second embodiment of the present disclosure.

In the example described above, the tool 2 is provided with the reception unit 50 for receiving a wireless signal. However, this is only an example and should not be construed as limiting. Alternatively, the tool 2 may also be provided with a transmission unit 51 for transmitting a wireless signal as shown in FIG. 11. The transmission unit 51 transmits the wireless signal to the communications device 500. The communications device 500 includes a plurality of antennas functioning as a reception unit 502. The tool 2 and the communications device 500 are configured to communicate with each other. The communications device 500 transmits reception information received at the reception unit 502 to the tool 2. The signal processing unit 331 determines the location of the tool 2 based on the reception information received from the communications device 500.

Optionally, the communications device 500 may include a signal processing unit for determining the location of the tool 2 based on the reception information received at the reception unit 502 and may be configured to transmit the location data, obtained by the signal processing unit, to the tool 2.

Also, a plurality of communications devices 500 may be provided. In that case, each communications device 500 may be configured such that the reception unit 502 includes only one antenna. Each communications device 500 transmits reception information, including the timing when the antenna of the reception unit 502 has received a wireless signal and the reception strength of the wireless signal, to the tool 2. The signal processing unit 331 of the tool 2 determines the location of the tool 2 based on the reception information received from the respective communications devices 500.

In the example described above, the wireless signal is transmitted via radio waves as transmission medium. However, this is only an example and should not be construed as limiting. Alternatively, the wireless signal may also be an optical signal to be transmitted via visible or non-visible light as transmission medium. In that case, the signal processing unit 331 determines the location of the tool 2 based on, for example, a time lag between a time when the transmission unit has transmitted an optical signal and a time when the reception unit receives the optical signal.

Note that the first and second embodiments and respective variations of the first and second embodiments described above are just exemplary configurations of a tool system according to the present disclosure and should not be construed as limiting. Optionally, a tool system may also be configured as an appropriate combination of the configurations of the first and second embodiments and variations thereof. For example, a tool system may include both the image processing unit 33 (33b) described for the first embodiment and the signal processing unit 331 described for the variation of the second embodiment. This allows the current work object to be identified based on both the result of the image processing by the image processing unit 33 (33b) and the result of the tool 2 location determination by the signal processing unit 331, thus improving the identification accuracy of the current work object.

(5) Resume

A tool system (1, 1a, 1b, 1c, 1d) according to a first aspect includes a portable tool (2) and an identification unit (330). The tool (2) includes a driving unit (24) to operate with power supplied from a power source (such as a battery pack 201). The identification unit (330) identifies, by a contactless method, a current work object, on which the tool (2) is set in place, out of a plurality of work objects.

This configuration allows the identification unit (330) to identify the current work object, on which the tool (2) is set in place, before work starts to be performed on the work object using the tool (2). Thus, the worker is able to control the tool (2) depending on the current work object before starting the work.

In a tool system (1c, 1d) according to a second aspect, which may be implemented in conjunction with the first aspect, the tool (2) includes a tool-end control unit (3). The tool-end control unit (3) performs a predetermined type of processing, when finding the current work object, identified by the identification unit (330), not conforming to a reference working procedure in terms of its corresponding working process step.

This configuration allows the worker to control, when finding the current work object not conforming to the reference working procedure, the tool (2) such that the tool (2) performs the predetermined type of processing.

In a tool system (1c, 1d) according to a third aspect, which may be implemented in conjunction with the second aspect, the predetermined type of processing includes processing in which the tool-end control unit (3) deactivates the driving unit (24).

This configuration reduces the chances of the worker performing work on the work object in a wrong working order.

In a tool system (1c, 1d) according to a fourth aspect, which may be implemented in conjunction with the second or third aspect, the tool (2) includes a worker notification unit (211) to send a notification to a worker. The predetermined type of processing includes processing in which the tool-end control unit (3) makes the worker notification unit (211) send the notification.

This configuration allows the worker to notice that the working order is wrong.

In a tool system (1c, 1d) according to a fifth aspect, which may be implemented in conjunction with any one of the second to fourth aspects, the tool (2) includes a device notification unit (60) to send a notification to an external device (90). The predetermined type of processing includes processing in which the tool-end control unit (3) makes the device notification unit (60) send the notification.

This configuration allows a work object, for which the worker tends to adopt a wrong working order, to be identified.

In a tool system (1c, 1d) according to a sixth aspect, which may be implemented in conjunction with any one of the second to fifth aspects, when finding that objects corresponding to the current work object identified by the identification unit (330) have been changed from a first object into a second object requiring a different working process from the first object, the tool-end control unit (3) changes the reference working procedures from a first reference working procedure for the first object into a second reference working procedure for the second object.

This configuration allows the reference working procedures to be changed according to the current work object, thus saving the worker the trouble of changing the reference working procedures by him- or herself.

In a tool system (1c, 1d) according to a seventh aspect, which may be implemented in conjunction with the sixth aspect, the tool-end control unit (3) defines, when changing the reference working procedures from the first reference working procedure into the second reference working procedure, the working process step for the current work object to be the first working process step according to the second reference working procedure.

This configuration reduces the chances of the work being started from halfway through the reference working procedure.

A tool system (1d) according to an eighth aspect, which may be implemented in conjunction with any one of the first to seventh aspects, further includes a transmission unit (51, 501) to transmit a wireless signal; and a reception unit (50, 502) to receive the wireless signal transmitted from the transmission unit (51, 501). The tool (2) includes either the transmission unit (51, 501) or the reception unit (50, 502). The identification unit (330) identifies the current work object based on reception information about reception of the wireless signal at the reception unit (50, 502).

This configuration allows the identification unit (330) to identify the current work object by determining the location of the tool (2) based on the reception information.

A tool system (1, 1a, 1b) according to a ninth aspect, which may be implemented in conjunction with any one of the first to eighth aspects, further includes an image capturing unit (5) and an image storage unit (41). The image capturing unit (5) is provided for the tool (2) to generate a captured image. The image storage unit (41) stores a plurality of reference images associated with the plurality of work objects. The identification unit (330) includes an image processing unit (33, 33b) to perform image processing by comparing the captured image generated by the image capturing unit (5) with a plurality of reference images and identify an actually shot work object as the current work object. The actually shot work object is a work object, shot in the captured image, out of the plurality of work objects.

This configuration allows the tool system (1, 1a, 1b) to identify a plurality of work objects from each other on an individual basis through the image processing by the image processing unit (33, 33b). In addition, the tool system (1, 1a, 1b) is also allowed, even when the worker is working on a plurality of work objects in the same workplace or when the plurality of work objects are close to each other, to identify the plurality of work objects from each other on an individual basis.

In a tool system (1, 1a) according to a tenth aspect, which may be implemented in conjunction with the ninth aspect, the image storage unit (41) and the image processing unit (33) are provided for the tool (2).

This configuration eliminates the need to provide any additional device for the tool system (1, 1a) separately from the tool (2) because the image processing unit (33) provided for the tool (2) identifies the actually shot work object. In addition, eliminating the need to transmit the captured image to any other device shortens the amount of time it takes for the image processing unit (33) to identify the actually shot work object.

A tool system (1b) according to an eleventh aspect, which may be implemented in conjunction with the ninth aspect, further includes a processor (9) provided with the image storage unit (41b) and the image processing unit (33b). The tool (2) further includes a communications unit (6) to transmit the captured image to the processor (9).

In a tool system (1b) with such a configuration, there is no need for the tool (2) to include any high-performance control unit, because the image processing unit (33b) provided for the processor (9) identifies the actually shot work object. In addition, this also allows the single processor (9) to identify the work objects shot by the respective image capturing units (5) of the plurality of tools (2) (i.e., the actually shot work objects).

In a tool system (1, 1a, 1b) according to a twelfth aspect, which may be implemented in conjunction with any one of the ninth to eleventh aspects, the tool (2) includes a notification unit (211) to send a notification when the image processing unit (33, 33b) identifies the actually shot work object.

This configuration allows the worker to recognize that the image processing unit (33, 33b) has identified the actually shot work object.

In a tool system (1, 1a, 1b) according to a thirteenth aspect, which may be implemented in conjunction with any one of the ninth to twelfth aspects, the image processing unit (33, 33b) performs image processing in such a manner as to preferentially select, following a working procedure indicating an order of working process steps to be performed on the plurality of work objects, one reference image, corresponding to a work object to be processed in a forthcoming working process step, out of the plurality of reference images and compare the reference image selected with the captured image.

According to this configuration, the tool system (1, 1a, 1b) makes the image processing unit (33, 33b) select, following the working procedure, one of the reference images by predicting the work object to be shot next in the captured image. This shortens the amount of time it takes for the image processing unit (33, 33b) to identify the work object shot in the captured image.

In a tool system (1, 1a, 1b) according to a fourteenth aspect, which may be implemented in conjunction with any one of the ninth to thirteenth aspects, the tool (2) is either a screwdriver or a wrench for use to perform work of attaching a plurality of fastening members onto the plurality of work objects, respectively, by turning the driving unit (24). The tool system (1, 1a, 1b) includes a target value storage unit (42, 42b) to store a plurality of target values associated with the plurality of work objects. The tool (2) further includes a driving control unit (31) to control the driving unit (24) by acquiring one target value, associated with the actually shot work object identified by the image processing unit (33, 33b), out of the plurality of target values such that a work value becomes a value based on the target value thus acquired.

This configuration allows the tool system (1, 1a, 1b) to set a working setting at a target value associated with the work object shot by the image capturing unit (5). Thus, the tool system (1, 1a, 1b) saves the worker the trouble of manually entering the working setting and reduces the chances of the fastening work being performed at a wrong working setting. In addition, a target value associated with the work object shot by the image capturing unit (5) (i.e., the actually shot work object) is set as the working setting. Therefore, even if the worker has performed the fastening work in a different working process step, not conforming to the working procedure indicating a predetermined order of working, the fastening members are still fastened at a target value associated with each work object.

In a tool system (1) according to a fifteenth aspect, which may be implemented in conjunction with the fourteenth aspect, the tool (2) includes a registration mode as an operation mode thereof. The tool (2) further includes a registration unit (36) to perform image storage processing of making the image storage unit (41) store the plurality of reference images when the operation mode of the tool (2) is the registration mode and target value storage processing of making the target value storage unit (42) store the plurality of target values. The image storage processing includes making the image storage unit (41) store, as the plurality of reference images, a plurality of still images generated by the image capturing unit (5) by shooting the plurality of work objects. The target value storage processing includes making the target value storage unit (42) store, as the plurality of target values, respective working settings defined when the plurality of fastening members are attached to the plurality of work objects.

This configuration allows the tool system (1) to perform, in parallel with each other, assembling work of attaching a plurality of fastening members to a plurality of work objects and registration work of performing image registration processing and target value storage processing.

In a tool system (1, 1a, 1b) according to a sixteenth aspect, which may be implemented in conjunction with the fourteenth or fifteenth aspect, the tool (2) further includes a decision unit (35) to determine whether each of work values, generated when the plurality of fastening members are respectively attached to the plurality of work objects, is a normal one or not. The tool system (1, 1a, 1b) includes a result storage unit (43, 43b) to store respective decision results obtained by the decision unit (35) for the plurality of work objects.

The tool system (1, 1a, 1b) with this configuration allows the worker to confirm respective decision results for the plurality of work objects after having performed the fastening work. In addition, the decision results obtained by the decision unit (35) are associated with the work objects shot by the image capturing unit (5) (i.e., the actually shot work objects). This allows the worker to confirm, even after having performed the fastening work in a different working process step not conforming to the working procedure indicating a predetermined order of working, the decision results associated with the respective work objects.

In a tool system (1, 1a, 1b) according to a seventeenth aspect, which may be implemented in conjunction with any one of the fourteenth to sixteenth aspects, the image capturing unit (5) is provided for the tool (2) such that either a bit or socket (242) attached to the tool (2) falls within an image capturing range. The image processing unit (33, 33b) recognizes, based on the captured image, a type of the bit or the socket (242). The driving control unit (31) corrects, according to the type of the bit or the socket (242) recognized by the image processing unit (33, 33b), a target value associated with the actually shot work object and thereby controls the driving unit (24) such that the work value becomes equal to the target value thus corrected.

This configuration allows the tool system (1, 1a, 1b) to reduce dispersion in work value according to the length of the bit or socket (242).

In a tool system (1, 1a, 1b) according to an eighteenth aspect, which may be implemented in conjunction with any one of the ninth to thirteenth aspects, the tool (2) is either a screwdriver or a wrench for use to perform work of attaching a plurality of fastening members onto the plurality of work objects, respectively, by turning the driving unit (24). The image capturing unit (5) is provided for the tool (2) such that either a bit or socket (242) attached to the tool (2) falls within an image capturing range. The image processing unit (33, 33b) recognizes, based on the captured image, a type of the bit or the socket (242). The tool (2) further includes a driving control unit (31) to control the driving unit (24) such that a work value becomes a value corresponding to the type, recognized by the image processing unit (33, 33b), of the bit or the socket (242).

The tool system (1, 1a, 1b) with this configuration saves the worker the trouble of manually entering a working setting, thus allowing the worker to perform the fastening work at a value corresponding to the type of the bit or socket (242).

REFERENCE SIGNS LIST 1, 1a, 1b, 1c, 1d Tool System
2 Tool
201 Battery Pack (Power Source)
211 Notification Unit (Worker Notification Unit)
24 Driving Unit
242 Socket
3 Tool-End Control Unit
31 Driving Control Unit
33, 33b Image Processing Unit
330 Identification Unit
35 Decision Unit
36 Registration Unit
41, 41b Image Storage Unit
42, 42b Torque Storage Unit (Target Value Storage Unit)
43, 43a, 43b Result Storage Unit
5 Image Capturing Unit
50 Reception Unit
51 Transmission Unit
6 Communications Unit
90 Device Notification Unit
9 Processor
90 External Device

The invention claimed is:

1. A tool system comprising:
a portable tool including a driving unit, the driving unit being configured to operate with power supplied from a power source;
an identification unit configured to identify, by a contactless method, a current work object, on which the tool is set in place, out of a plurality of work objects and
a tool-end control unit configured to, when finding the current work object, identified by the identification unit, is not conforming to a reference working procedure in terms of a working process step for the current work object, perform a predetermined type of processing which is different from processing a work for the current work object.

2. The tool system of claim 1, wherein
the predetermined type of processing includes processing in which the tool-end control unit deactivates the driving unit.

3. The tool system of claim 1, wherein
the tool includes a worker notification unit configured to send a notification to a worker, and
the predetermined type of processing includes processing in which the tool-end control unit makes the worker notification unit send the notification.

4. The tool system of claim 1, wherein
the tool includes a device notification unit configured to send a notification to an external device, and
the predetermined type of processing includes processing in which the tool-end control unit makes the device notification unit send the notification.

5. The tool system of claim 1, wherein
the tool-end control unit is configured to, when finding that objects corresponding to the current work object identified by the identification unit have been changed from a first object into a second object requiring a different working process from the first object, change the reference working procedures from a first reference working procedure for the first object into a second reference working procedure for the second object.

6. The tool system of claim 5, wherein
the tool-end control unit is configured to, when changing the reference working procedures from the first reference working procedure into the second reference working procedure, define the working process step for the current work object to be the first working process step according to the second reference working procedure.

7. The tool system of claim 1, comprising:
a transmission unit configured to transmit a wireless signal; and
a reception unit configured to receive the wireless signal transmitted from the transmission unit, wherein
the tool includes either the transmission unit or the reception unit, and
the identification unit is configured to identify the current work object based on reception information about reception of the wireless signal at the reception unit.

8. The tool system of claim 1, further comprising:
an image capturing unit provided for the tool and configured to generate a captured image; and
an image storage unit configured to store a plurality of reference images associated with the plurality of work objects, wherein
the identification unit includes an image processing unit configured to perform image processing by comparing the captured image generated by the image capturing unit with a plurality of reference images and identify an actually shot work object as the current work object, the actually shot work object being a work object, shot in the captured image, out of the plurality of work objects.

9. The tool system of claim 8, wherein
the image storage unit and the image processing unit are provided for the tool.

10. The tool system of claim 8, further comprising a processor provided with the image storage unit and the image processing unit, wherein
the tool includes a communications unit configured to transmit the captured image to the processor.

11. The tool system of claim 8, wherein
the tool includes a notification unit configured to send a notification when the image processing unit identifies the actually shot work object.

12. The tool system of claim 8, wherein
the image processing unit is configured to perform image processing in such a manner as to preferentially select, following a working procedure indicating an order of working process steps to be performed on the plurality of work objects, one reference image, corresponding to a work object to be processed in a forthcoming working process step, out of the plurality of reference images and compare the reference image selected with the captured image.

13. The tool system of any claim 8, wherein
the tool is either a screwdriver or a wrench for use to perform work of attaching a plurality of fastening members onto the plurality of work objects, respectively, by turning the driving unit,
the tool system includes a target value storage unit configured to store a plurality of target values associated with the plurality of work objects, and
the tool further includes a driving control unit configured to control the driving unit by acquiring one target value, associated with the actually shot work object identified by the image processing unit, out of the plurality of target values such that a work value becomes a value based on the target value thus acquired.

14. The tool system of claim 13, wherein
the tool includes a registration mode as an operation mode thereof,
the tool further includes a registration unit configured to perform image storage processing of making the image storage unit store the plurality of reference images when the operation mode of the tool is the registration mode and target value storage processing of making the target value storage unit store the plurality of target values,
the image storage processing includes making the image storage unit store, as the plurality of reference images, a plurality of still images generated by the image capturing unit by shooting the plurality of work objects, and
the target value storage processing includes making the target value storage unit store, as the plurality of target values, respective working settings defined when the plurality of fastening members are attached to the plurality of work objects.

15. The tool system of claim 13, wherein
the tool further includes a decision unit configured to determine whether each of work values, generated when the plurality of fastening members are respectively attached to the plurality of work objects, is a normal one or not, and
the tool system includes a result storage unit configured to store respective decision results obtained by the decision unit for the plurality of work objects.

16. The tool system of any claim 13, wherein
the image capturing unit is provided for the tool such that either a bit or socket attached to the tool falls within an image capturing range,
the image processing unit is configured to recognize, based on the captured image, a type of the bit or the socket, and
the driving control unit is configured to correct, according to the type of the bit or the socket recognized by the image processing unit, a target value associated with the actually shot work object and thereby control the driving unit such that the work value becomes equal to the target value thus corrected.

17. The tool system of claim 8, wherein
the tool is either a screwdriver or a wrench for use to perform work of attaching a plurality of fastening members onto the plurality of work objects, respectively, by turning the driving unit,
the image capturing unit is provided for the tool such that either a bit or socket attached to the tool falls within an image capturing range,
the image processing unit recognizes, based on the captured image, a type of the bit or the socket, and
the tool further includes a driving control unit configured to control the driving unit such that a work value becomes a value corresponding to the type, recognized by the image processing unit, of the bit or the socket.

* * * * *